(12) United States Patent
Kikuchi et al.

(10) Patent No.: US 8,388,053 B2
(45) Date of Patent: Mar. 5, 2013

(54) ROOF APPARATUS

(75) Inventors: Mitsutoshi Kikuchi, Kariya (JP);
Kazuki Sawada, Handa (JP)

(73) Assignee: Aisin Seiki Kabushiki Kaisha,
Kariya-shi, Aichi-ken (JP)

( * ) Notice: Subject to any disclaimer, the term of this patent is extended or adjusted under 35 U.S.C. 154(b) by 0 days.

(21) Appl. No.: 13/137,140

(22) Filed: Jul. 22, 2011

(65) Prior Publication Data
US 2012/0112499 A1    May 10, 2012

(30) Foreign Application Priority Data
Nov. 5, 2010    (JP) ................. 2010-248697

(51) Int. Cl.
*B60J 7/057* (2006.01)
*B60J 7/047* (2006.01)
(52) U.S. Cl. ............... 296/223; 296/216.08; 296/216.05
(58) Field of Classification Search ...... 296/216.01–224
See application file for complete search history.

(56) References Cited

U.S. PATENT DOCUMENTS

| 4,830,428 | A * | 5/1989 | Masuda et al. ............... 296/219 |
| 7,178,862 | B2 | 2/2007 | Oechel |
| 7,731,275 | B2 * | 6/2010 | Bergmiller et al. ...... 296/216.08 |
| 7,828,376 | B2 | 11/2010 | Nellen |
| 2001/0028180 | A1 | 10/2001 | Tsuruo et al. |

FOREIGN PATENT DOCUMENTS
EP    2 078 630    3/2011

OTHER PUBLICATIONS
Extended European Search Report for EP Appl. No. 11177314.9 dated Jan. 15, 2013.

* cited by examiner

*Primary Examiner* — Dennis Pedder
(74) *Attorney, Agent, or Firm* — Finnegan, Henderson, Farabow, Garrett & Dunner, LLP

(57) ABSTRACT

A roof apparatus includes a guide rail extending in a front-rear direction of a vehicle, a drive shoe slidable along the guide rail, a functional bracket supporting a movable panel, a front link member relatively rotatably connected at a front portion of the functional bracket and including a supporting portion supported by a supporting wall portion of the guide rail, a lifting mechanism connected to a rear portion of the functional bracket, a weather strip attached at an opening edge portion of a roof panel, the supporting wall portion of the guide rail and the supporting portion of the front link member are located inwardly of an outer end surface of the movable panel in a vehicle width direction, the drive shoe is located below the weather strip, and the front link member is located between the supporting wall portion and the drive shoe in the vehicle width direction.

6 Claims, 18 Drawing Sheets

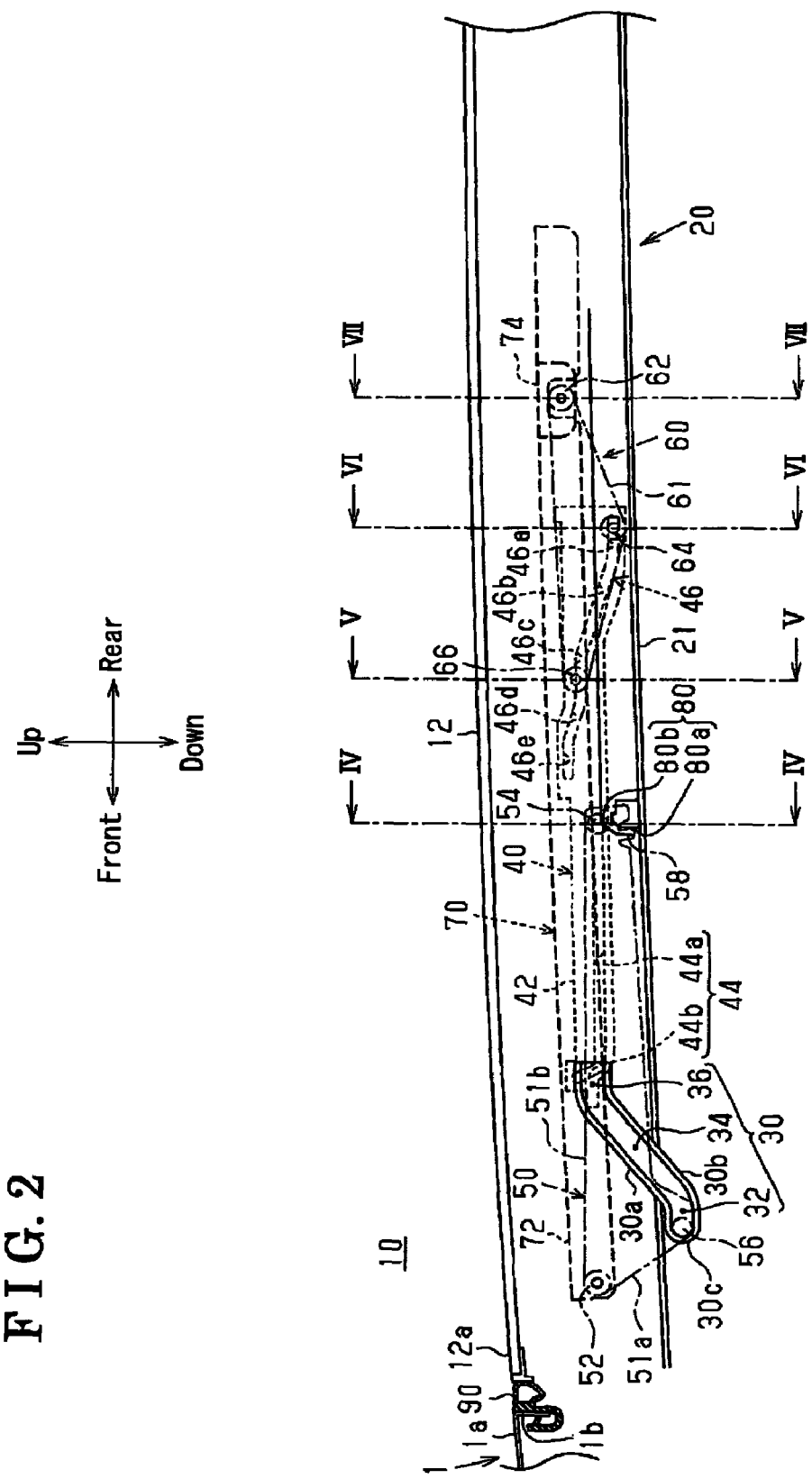

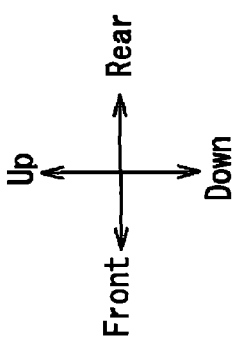
FIG. 17
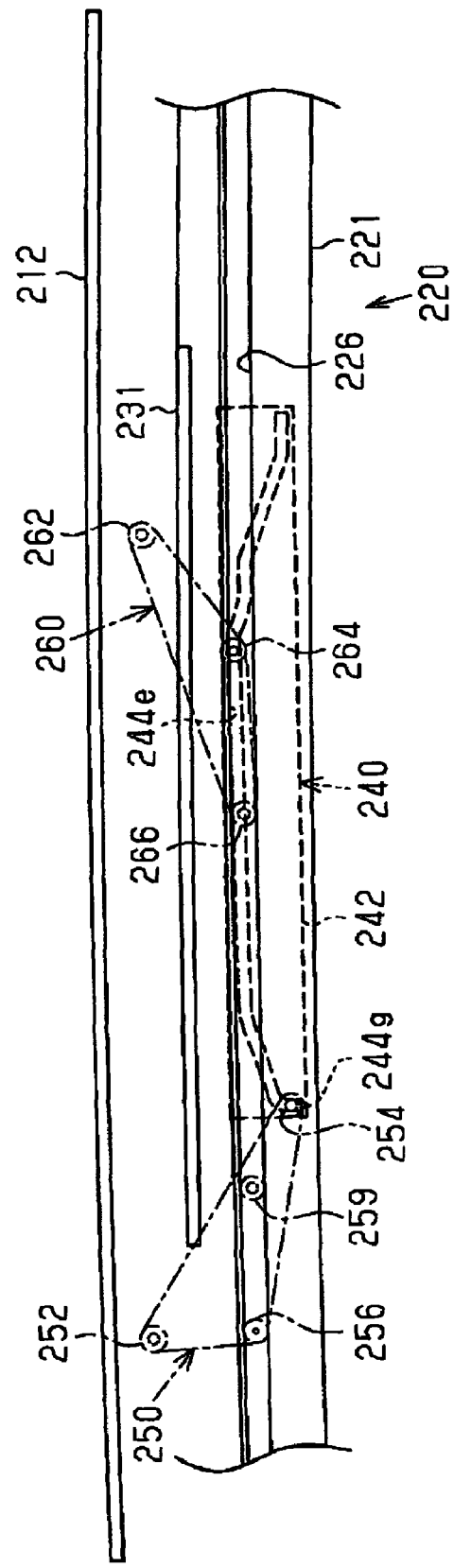

ROOF APPARATUS

CROSS REFERENCE TO RELATED APPLICATIONS

This application is based on and claims priority under 35 U.S.C. §119 to Japanese Patent Application 2010-248697, filed on Nov. 5, 2010, the entire content of which is incorporated herein by reference.

TECHNICAL FIELD

This disclosure generally relates to a roof apparatus. More specifically, this disclosure pertains to the roof apparatus, which is configured so as to open and close a movable panel provided at an opening portion of a roof panel of a vehicle and which includes a tilt-up mode and a slide-mode as opening and closing operation modes.

BACKGROUND DISCUSSION

Disclosed in EP2078630A1 is an example of a known roof apparatus. Generally, the roof apparatus including the open roof construction for the vehicle disclosed in EP2078630A1 includes a guide rail, which is fixed on a roof panel of a vehicle and extends in a front-rear direction of the vehicle, and a drive shoe, which is provided on the guide rail while allowing the drive shoe to be movable on the guide rail in the front-rear direction. In a case where the drive shoe is moved in the front-rear direction via a belt, which is driven by a motor, a movable panel is operated to open and close an opening of the roof panel via a link mechanism.

According to EP2078630A1, a weather strip is provided at an opening edge portion of the roof panel extending in the front-rear direction in order to seal a clearance formed between an edge portion of a panel and the opening edge portion of the roof panel. Furthermore, according to EP2078630A1, a guiding slide is provided on the guide rail at a position below the edge portion of the panel. A lever (a front lever) is provided outwardly of the guide slide in a vehicle width direction. The lever is connected to a front portion of a panel bracket, which supports the panel, and is engaged with the guiding slide. Accordingly, in the case where the guiding slide is moved in the front-rear direction, the lever is displaced in accordance with the movement of the guiding slide, thereby operating the panel to be opened and closed via the panel bracket. A guide member (a supporting portion) of the lever and a supporting wall portion of the guide rail supporting the guide member are located below the weather strip. Furthermore, the roof apparatus disclosed in EP2078630A1 is configured so that the lever is upwardly displaced as the guide member of the lever and the supporting wall portion of the guide rail are positioned upwardly in a vertical direction in order to displace the panel upwardly. In other words, the guide member and the supporting wall portion restrict the displacement of the lever in the vertically upward direction.

According to the roof apparatus disclosed in EP2078630A1, the roof panel includes a panel main body defining an upper surface of a vehicle body and a flange portion curved from an inner end portion of the panel main body in the vehicle width direction and downwardly extending. Additionally, the weather strip includes an attachment portion, at which the weather strip is attached on a side surface of an inner side surface of the flange portion in the vehicle width direction by means of a double-sided adhesive tape, and a hollow shape seal portion, which is formed to inwardly protrude from the attachment portion in the vehicle width direction.

According to the roof apparatus disclosed in EP2078630A1, the weather strip is located above the guide member of the lever. Furthermore, because the weather strip is attached on the flange portion of the roof panel by means of the double-sided adhesive tape, the weather strip is formed so as to have a smaller attachment cross-sectional surface in order to avoid interference between the weather strip and the lever. However, the roof apparatus disclosed in EP2078630A may complicate an attachment process of the weather strip.

A need thus exists for a roof apparatus which is not susceptible to the drawback mentioned above.

SUMMARY

According to an aspect of this disclosure, a roof apparatus, which is configured so as to open and close a movable panel provided at an opening portion of a roof panel of a vehicle and which includes a tilt-up mode and a slide mode as opening and closing operation modes, the roof apparatus includes a guide rail fixed at the roof panel and extending in a front-rear direction of the vehicle, a drive shoe driven so as to move along the guide rail in the front-rear direction of the vehicle, a functional bracket supporting the movable panel, a front link member connected at a front portion of the functional bracket so as to be rotatable relative to the functional bracket, including a supporting portion, which is rotatably supported by a supporting wall portion of the guide rail, and operating the front portion of the functional bracket in a manner that the front link member is displaced in response to a movement of the drive shoe, a lifting mechanism connected to a rear portion of the functional bracket and lifting the rear portion of the functional bracket in response to the movement of the drive shoe, and a weather strip attached at an opening edge portion of the roof panel extending in the front-rear direction of the vehicle and sealing a clearance formed between the opening edge portion and an edge portion of the movable panel, wherein the supporting wall portion of the guide rail and the supporting portion of the front link member are located inwardly of an outer end surface of the movable panel in a vehicle width direction, the drive shoe is located downwardly of the weather strip in a vertical direction, and the front link member is located between the supporting wall portion of the guide rail and the drive shoe in the vehicle width direction.

According to another aspect of this disclosure,

According to a further aspect of this disclosure,

BRIEF DESCRIPTION OF THE DRAWINGS

The foregoing and additional features and characteristics of this disclosure will become more apparent from the following detailed description considered with the reference to the accompanying drawings, wherein:

FIG. 2 is a cross-sectional diagram illustrating the configuration of the sun roof apparatus centering on a movable panel while being in a fully-closed state when being viewed in a vehicle width direction;

FIG. 17 is a cross-sectional diagram illustrating the configuration of the sun roof apparatus centering on the movable panel in a state where the slide operation is completed when being viewed in the vehicle width direction;

DETAILED DESCRIPTION

First Embodiment

A first embodiment of a roof apparatus, which is adapted as a sun roof apparatus 10 mounted on a vehicle, will be described below with reference to FIGS. 1 to 13.

In this disclosure, a front-rear direction of the vehicle is also referred to simply as a "front-rear direction". An upper direction (up) in a vertical direction is also referred to simply as "up (upward)". A downward direction (down) in the vertical direction is also referred to simply as "down (downward)". Additionally, a side (an aspect) positioned closer to a center of the sun roof apparatus 10 in a vehicle width direction is also referred to as "inward (in)". On the other hand, a side (an aspect) positioned so as to be distanced away from the center of the sun roof apparatus 10 in the vehicle direction is also referred to as "outward (out)".

Figure 1A:
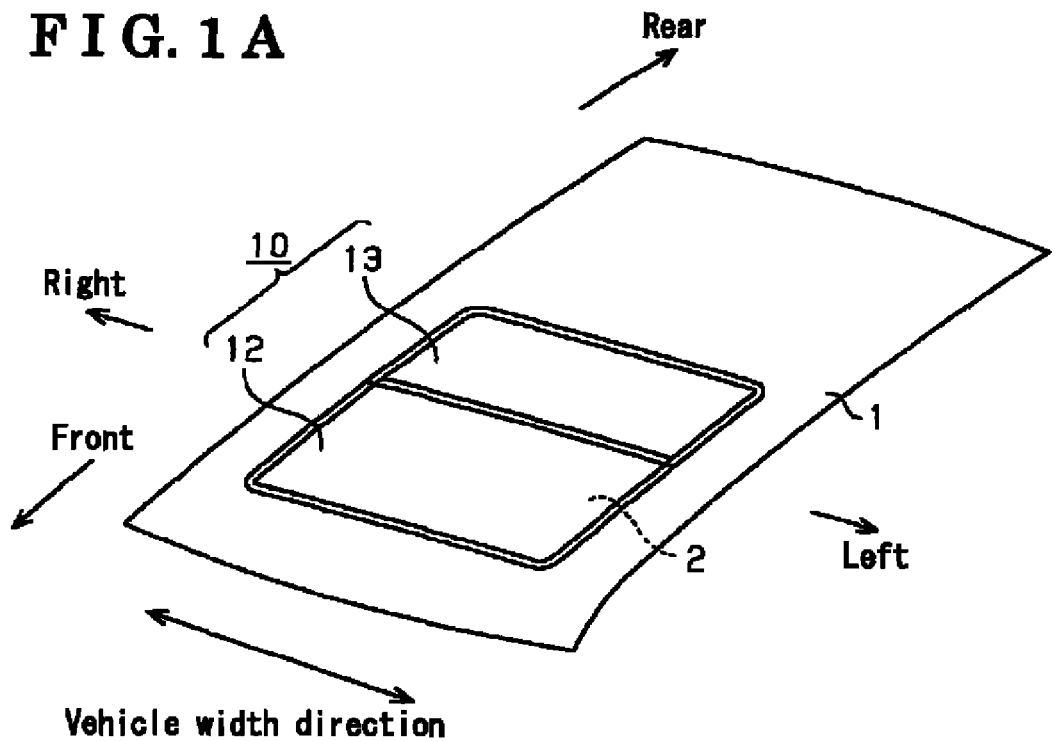
FIG. 1A is a perspective view schematically illustrating a configuration example of a vehicle roof, which is adapted as a sun roof apparatus and at which a roof apparatus according to a first embodiment is adapted, while being in a closed state.

Illustrated in FIG. 1A is a schematic perspective view of a vehicle roof on which the sun roof apparatus 10 is mounted while the sun roof apparatus 10 is in a closed state. On the other hand, illustrated in FIG. 1B is a schematic perspective view of the vehicle roof on which the sun roof apparatus 10 is mounted while the sun roof apparatus 10 is in a fully-opened state.

Figure 1B:
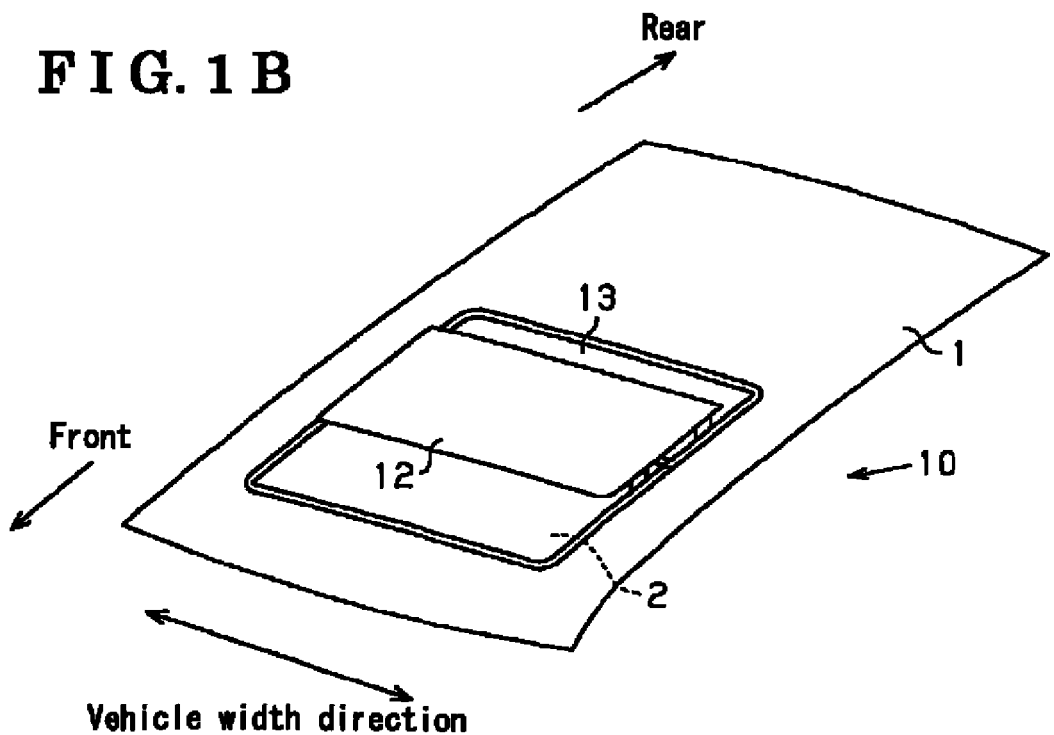
FIG. 1B is a perspective view schematically illustrating a configuration example of the sun roof apparatus according to the first embodiment while being in a fully-opened state.

As illustrated in FIGS. 1A and 1B, an opening portion 2 in a substantially rectangular shape is formed on a roof panel 1 defining the vehicle roof. A movable panel 12 and a fixing panel 13 are provided a the opening portion 2 in the above-mentioned order in the front-rear direction so that the movable panel 12 is arranged in front of the fixing panel 13 (so that the movable panel 12 is arranged at a position closer to a front portion of the vehicle relative to the fixing panel 13). Each of the movable panel 12 and the fixing panel 13 is made of a light transmissive glass. The movable panel 12 and the fixing panel 13 close the opening portion 2 from above while the sun roof apparatus 10 is in the closed state.

The movable panel 12 is provided at the opening portion 2 of the roof panel 1 so as to be tilted up and slidable in the front-rear direction. According to the sun roof apparatus 10 in this embodiment, a so-called outer slide system, where the movable panel 12 is slid while being tilted up, is adapted.

The fixing panel 13 is fixed on the roof panel 1 in order to maintain a state where a portion of the opening portion 2 corresponding to the arrangement position of the fixing panel 13 is closed. A mechanism for opening and closing the movable panel 12 will be described below with reference to FIGS. 2 to 13.

Illustrated in FIG. 2 is a cross-sectional diagram of a configuration of the sun roof apparatus 10 centering on the fixing panel 13 while being in the fully-closed state when being viewed in the vehicle width direction. In FIG. 2, different types of lines are used for different components in order to facilitate an explanation.

Additionally, because the sun roof apparatus 10 is essentially formed to be symmetric, the configuration of the sun roof apparatus 10 will be described below with a left side portion of the sun roof apparatus 10 as an example.

As illustrated in FIG. 2, the roof panel 1 includes panel main body 1a and a flange portion 1b. The panel main body 1a defines an upper surface of the vehicle roof. The flange portion 1b downwardly extends from a rear end portion of the panel main body 1a so as to form an opening edge portion of the roof panel 1. A weather strip 90 is provided at the flange portion 1b in order to seal a clearance formed between a rear side surface of the flange portion 1b (i.e. a side surface of the flange portion 1b facing the right in FIG. 2) and a front edge portion 12a of the movable panel 12.

A guide rail 20, which is formed to extend in the front-rear direction, is fixed on the movable panel 12 so as to be located below the movable panel 12. A front guide member 30 is attached at a front portion of a bottom portion 21 of the guide rail 20. Furthermore, a drive shoe 40 is provided at the guide rail 20 so as to be positioned behind the front guide member 30 while allowing the drive shoe 40 to be movable in the front-rear direction along the guide rail 20. Still further, a front link member 50 and a rear link member 60 are supported by the guide rail 20 while allowing the front link member 50 and the rear link member 60 to be slidable along the guide rail 20. A functional bracket 70, which supports the movable panel 12, is connected to the front link member 50 and the rear link member 60 while being positioned above the front link member 50 and the rear link member 60.

The front guide member 30 includes a front groove portion 32, an inclined groove portion 34 and a rear groove portion 36. The front groove portion 32 is formed so as to extend in the front-rear direction. The inclined groove portion 34 continuously extends from a rear end portion of the front groove portion 32 and extends in a diagonally rearward and upward direction. The rear groove portion 36 continuously extends from a rear end portion of the inclined groove portion 34 and extends in the front-rear direction. The successive groove including the front groove portion 32, the inclined groove portion 34 and the rear groove portion 36 is defined by an upper support surface 30a, a lower support surface 30b, which is located below the upper support surface 30a, and a connecting surface 30c, which connects a front end portion of the upper support surface 30a and a front end portion of the lower support surface 30b. The front groove portion 32 is located downwardly of the bottom portion 21, which is located at the lowermost position of the guide rail 20. Furthermore, a front end portion of the front groove portion 32 is closed by the connecting surface 30c. The rear groove portion 36 is located upwardly of the bottom portion 21. Furthermore, a rear end portion of the rear groove portion 36 is opened (is not closed).

The drive shoe 40 includes a shoe main body 42 (i.e. a main body of the drive shoe 40) and two grooves (a first groove portion 44 and a second groove portion 46. The shoe main body 42 is formed in a flat plate shape extending in the front-rear direction. The first groove portion 44 and the second groove portion 46 are formed on an inner side surface of the shoe main body 42 so as to extend in the front-rear direction. Additionally, a belt 100, which is driven by an electric motor so as to be moved in the front-rear direction, is connected to the shoe main body 42.

The first groove portion 44 includes a rear groove 44a and a front groove 44b. The rear groove 44a is formed to extend in the front-rear direction. The front groove 44b continuously extends from a front end portion of the rear groove 44a and extends in a diagonally forward and upward direction. A rear end portion of the rear groove 44a and a front end portion of the front groove 44b are both closed.

The second groove portion 46 is formed on the shoe main body 42 so as to be located rearwardly of the first groove portion 44 and so as to be independently of and separately from the first groove portion 44. The second groove portion 46 includes a rear longitudinal groove 46a, an inclined rear grove 46b, an intermediate longitudinal groove 46c, an inclined front groove 46d and a front longitudinal groove 46e. The rear longitudinal groove 46a is formed to extend in the front-rear direction. The inclined rear groove 46b continuously extends from a front end portion of the rear longitudinal groove 46a and extends in the diagonally forward and upward direction. The intermediate longitudinal grove 46c continuously extends from a front end portion of the inclined rear groove 46b and extends in the front-rear direction. The inclined front groove 46d continuously extends from a front end portion of the intermediate longitudinal groove 46c and extends in the diagonally forward and upward direction. The front longitudinal groove 46e continuously extends from a front end portion of the inclined front groove 46d and extends in the front-rear direction. A rear end portion of the rear longitudinal groove 46a and a front end portion of the front longitudinal groove 46e are both closed.

The front link member 50 is formed in a substantially flat plate shape. More specifically, the front link member 50 is formed to have a triangular shape when being viewed from a side thereof. While the sun roof apparatus 10 is in the fully-closed state, the front link member 50 is turned to be in a state where a portion of the front link member 50 corresponding to a longitudinal side thereof extends in the front-rear direction.

The front link member 50 includes a link member front portion 51a, at which a front connecting pin 52 is provided, a link member main body 51b (i.e. a main body of the front link member 50), at which a front engagement pin 54, a front support pin 56 and a restriction pin 58 are provided, and a link member connecting portion 51c, which connects the link member front portion 51a and the link member main body 51b. The front connecting pin 52 serves as a connecting portion. The front engagement pin 54 serves as an engagement portion. Furthermore, the front support pin 56 serves as a supporting portion.

The front connecting pin 52 is provided in the vicinity of an apex of the front link member 50 located at the foremost among three apexes thereof in a manner that the front connecting pin 52 protrudes in the vehicle width direction from a side surface of the link member front portion 51a. Furthermore, the front connecting pin 52 is connected to a front rotating portion 72, which is formed at a front end portion of the functional bracket 70, while allowing the front connecting pin 52 to be relatively rotatable.

The front engagement pin 54 is provided at the front link member 50 so as to be positioned in the vicinity of an apex located in the rearmost position among three apexes of the front link member 50 and so as to protrude in the vehicle width direction from the side surface of the link member main body 51b. The front engagement pin 54 is inserted into the first groove portion 44 of the drive shoe 40 while allowing the front engagement pin 54 to be slidably movable within the first groove portion 44, so that the front link member 50 is rotatable relative to the drive shoe 40. While the sun roof apparatus 10 is in the fully-closed state, the front engagement pin 54 is located within the rear groove 44a, more specifically, at the rear end portion of the rear groove 44a.

The front support pin 56 is arranged between the front connecting pin 52 and the front engagement pin 54 in the front-rear direction. Furthermore, the front support pin 56 is provided in the vicinity of an apex of the front link member 50 located downward of the front connecting pin 52 and the front engagement pin 54 so as to protrude from the side surface of the link member main body 51b in the vehicle width direction. The front support pin 56 is inserted into the front guide member 30. In other words, the front support pin 56 is rotatably supported by the front guide member 30. While the sun roof apparatus 10 is in the fully-closed state, the front support pin 56 is located within the front groove portion 32, more specifically, at the front end portion of the front groove portion 32.

The restriction pin 58 is formed on the front link member 50 so as to be positioned slightly below the front engagement pin 54 and so as to be positioned slightly forward of the front engagement pin 54. While the sun roof apparatus 10 is in the fully-closed state, the restriction pin 58 is located in front of a restriction block 80, which is fixed on the bottom portion 21 of the guide rail 20, so as to be in contact with a restriction surface 80a, which is a front end surface of the restriction block 80 in the front-rear direction. The restriction surface 80a is located right below the front engagement pin 54. Furthermore, the restriction block 80 includes a guide surface 80b, which extends in the diagonally rearward and upward direction from an upper end portion of the restriction surface 80a.

The rear link member 60 includes a link member main body 61, which is formed in a flat plate shape and in a triangular shape when being viewed from a side thereof, three pins (i.e. a rear connecting pin 62, a rear engagement pin 64 and a rear support pin 66), which protrude from a side surface of the link member main body 61 in the vehicle width direction. While the sun roof apparatus 10 is in the fully-closed state, the link member main body 61 is turned to be in a state where a portion of the link member main body 61 corresponding to a longitudinal side thereof extends in the front-rear direction.

The rear connecting pin 62 is provided at a portion in the vicinity of an apex located at the rearmost among three apexes of the link member main body 61. Furthermore, the rear connecting pin 62 is connected to a rear rotating portion 74, which is formed at a rear portion of the functional bracket 70, so as to be rotatable relative to the rear rotating portion 74 of the functional bracket 70. Additionally, the rear connecting pin 62 serves as a rear connecting portion.

The rear support pin 66 is provided at a portion in the vicinity of an apex located at the foremost among the three apexes of the link member main body 61. The rear support pin 66 is rotatably supported at the guide rail 20. The rear engagement pin 64 is provided between the rear connecting pin 62 and the rear engagement pin 64 in the front-rear direction. More specifically, the rear engagement pin 64 is provided at an apex of the rear link member 60 located downward of the rear connecting pin 62 and the rear engagement pin 64. Furthermore, the rear engagement pin 64 is inserted into the second groove portion 46 of the drive shoe 40. The rear engagement pin 64 is located within the rear longitudinal groove 46a, more specifically, at the rear portion of the rear longitudinal groove 46a while the sun roof apparatus 10 is in the fully-closed state. Additionally, the rear engagement pin 64 serves as a rear engagement portion.

Figure 3:
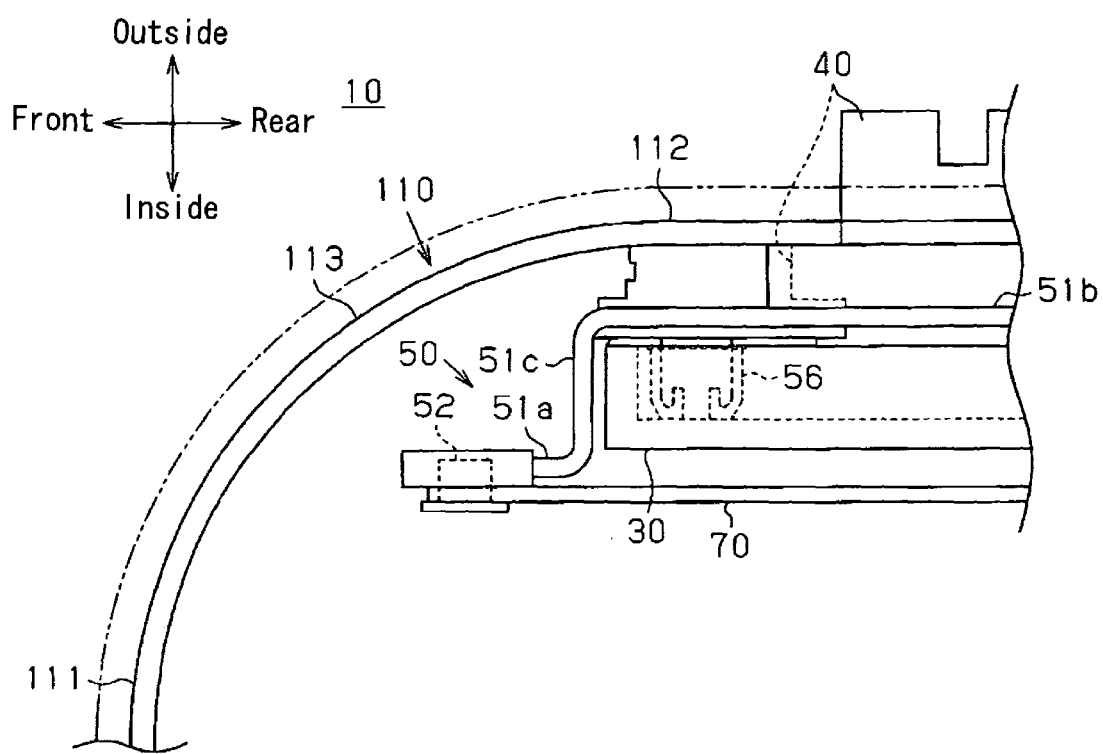
FIG. 3 is a plane view illustrating the configuration of the sun roof apparatus centering on a left front end portion of the sun roof apparatus in the vehicle width direction while being in the fully-closed state.

As illustrated in FIG. 3, the sun roof apparatus 10 of the first embodiment includes a front housing 110, which connects front end portions of the respective pair of the guide rails 20 arranged so as to keep a distance therebetween in the vehicle width direction. The front housing 110 includes a lateral portion 111 extending in the vehicle width direction, a longitudinal portion 112, which extends in the front-rear direction and which is located outwardly of the front link member 50 and the front guide member 30, and a curved portion 113, which connects the lateral portion 111 and the longitudinal portion 112 and extends therebetween while being curved at a predetermined curvature radius.

The link member main body 51b is arranged outwardly of the front guide member 30 in the vehicle width direction. The link member front portion 51a defines the front end portion of the front link member 50. Furthermore, the link member front portion 51a is located inwardly of the front guide member 30 in the vehicle width direction. A rear end portion of the link member front portion 51a and a front end portion of the link member main body 51b are connected to one another by means of the link member connecting portion 51c, which extends in the vehicle width direction. Accordingly, the front connecting pin 52, which is located at the front end portion of the front link member 50, is arranged at a position inwardly displaced from the link member main body 51b.

The curved portion 113 is formed so as to be curved from a position corresponding to the front end portion of the link member main body 51b in the front-rear direction, extend over the front end portion of the link member main body 51b and so as to be connected to the lateral portion 111.

An internal structure of the guide rail 20 and a positional relationship between the guide rail 20 and each component will be described below with reference to FIGS. 4 to 7.

As illustrated in FIGS. 4 to 7, the guide rail 20 is formed to have substantially the same shape at any positions thereof in the front-rear direction except for a portion of the guide rail 20 where the front guide member 30 is provided. More specifically, the guide rail 20 includes the bottom portion 21, which is located at the lowermost portion of the guide rail 20, an outwardly inclined wall portion 22a, an outer wall portion 22b and an inner wall portion 23. The outwardly inclined wall portion 22a is connected to an outer end portion of the bottom portion 21 and extends in the diagonally upward and outward direction. The outer wall portion 22b upwardly extends from an upper end portion of the outwardly inclined wall portion 22a. The inner wall portion 23 is connected to an inner end portion of the bottom portion 21 and upwardly extends from the inner end portion. The inner end portion of the bottom portion 21 is located inwardly of a right edge portion 12b of the movable panel 12 in the vehicle width direction. On the other hand, the outer end portion of the bottom portion 21 is located outwardly of the flange portion 1b of the roof panel 1.

Figure 4:
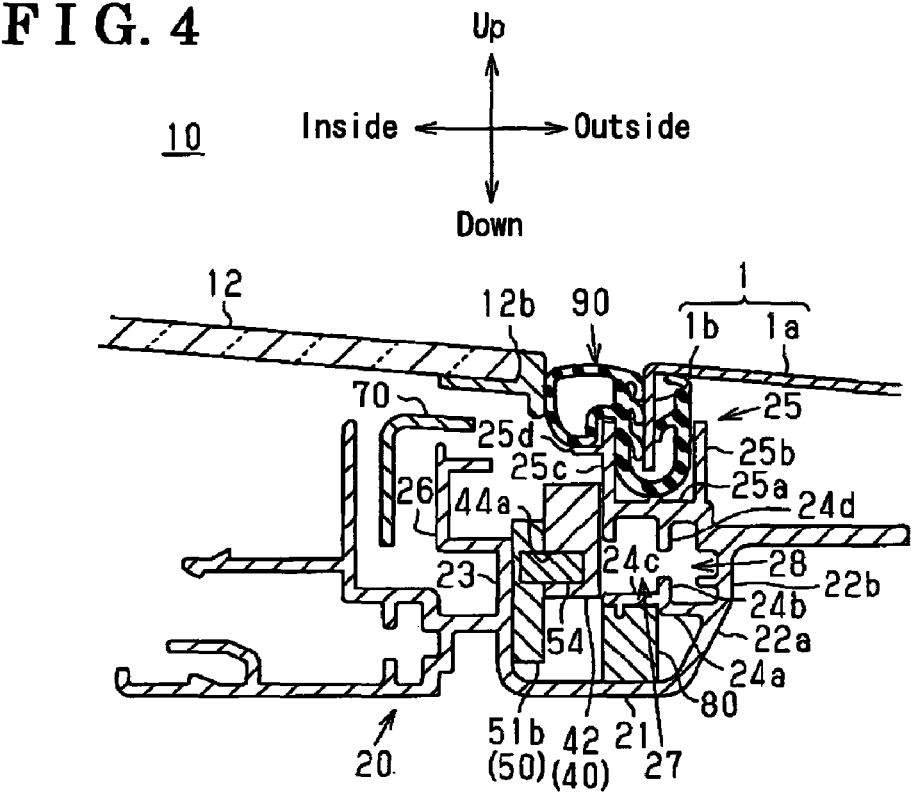
FIG. 4 is a cross-sectional diagram illustrating the configuration of the sun roof apparatus taken along line IV-IV in FIG. 2.

As illustrated in FIG. 4, the weather strip 90 is provided between the flange portion 1b of the roof panel 1 and the right edge portion 12b of the movable panel 12 in order to seal a clearance formed therebetween. The drive shoe 40 is provided so as to be located downwardly of the weather strip 90.

A holding portion 25 for holding the weather strip 90 is connected at an upper end portion of the outer wall portion 22b. The holding portion 25 includes a lateral wall portion 25a, an outer vertical wall portion 25b, an inner vertical wall portion 25c and an inwardly extending portion 25d. The lateral wall portion 25a inwardly extends from the upper end portion of the outer wall portion 22b. The outer vertical wall portion 25b upwardly extends from the upper end portion of the outer wall portion 22b. The inner vertical wall portion 25c upwardly and downwardly extends from an inner end portion of the lateral wall portion 25a. The inwardly extending portion 25d inwardly extends from a side surface of the inner vertical wall portion 25c. The flange portion 1b is position in a clearance formed between the outer vertical wall portion 25b and the inner vertical wall portion 25c.

A first partition wall portion 24a is formed at a lower end portion of the outer wall portion 22b so as to inwardly extend therefrom. A second partition wall portion 24b is formed at an inner end portion of the first partition wall portion 24a so as to upwardly extend therefrom. A third partition wall portion 24c is formed on a side surface of the second partition wall portion 24b so as to inwardly extend therefrom. A fourth partition wall portion 24d is formed on a lower surface of the lateral wall portion 25a so as to downwardly extend therefrom. An inner end portion of the third partition wall portion 24c is located right below the inner vertical wall portion 25c of the holding portion 25. Furthermore, the second partition wall portion 24b is located right below the fourth partition wall portion 24d.

The lateral wall portion 25a, the second partition wall portion 24b, the inner vertical wall portion 25c, the third partition wall portion 24c and the fourth partition wall portion 24d configure a guide portion 27, which is formed to be engaged with an engagement protruding portion 48 of the drive shoe 40 and to guide the drive shoe 40. Additionally, the first partition wall portion 24a, the second partition wall portion 24b, the fourth partition wall portion 24d, the outer wall portion 22b and the lateral wall portion 25a configure a belt supporting portion 28 for supporting the belt 100.

Figure 5:
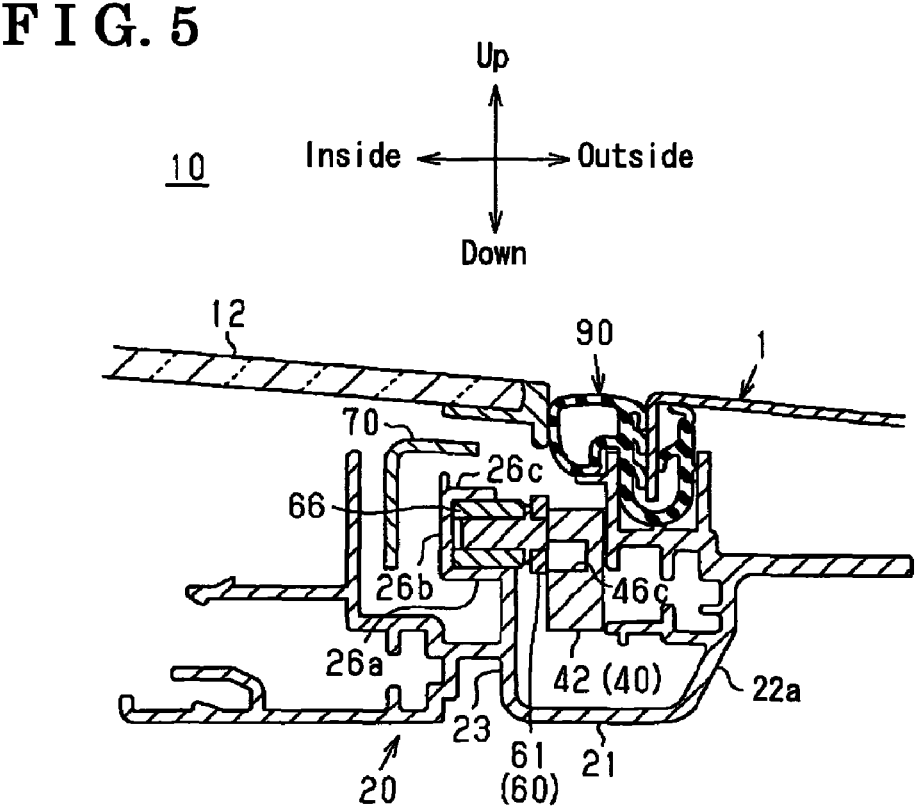
FIG. 5 is a cross-sectional diagram illustrating the configuration of the sun roof apparatus taken along line V-V in FIG. 2.

As illustrated in FIGS. 4 and 5, a first supporting wall portion 26a is formed at an upper end portion of the inner wall portion 23 so as to inwardly extend therefrom. A second supporting wall portion 26b is formed on an inner end portion of the first supporting wall portion 26a so as to upwardly extend therefrom. A third supporting wall portion 26c is formed at an upper end portion of the second supporting wall portion 26b so as to outwardly extend therefrom. An outer end portion of the third supporting wall portion 26c is located inwardly of the inner wall portion 23.

The first supporting wall portion 26a, the second supporting wall portion 26b and the third supporting wall portion 26c configure a supporting wall portion 26 for supporting the front support pin 56 of the front link member 50 and the rear support pin 66 of the rear link member 60. As illustrated in FIGS. 4 to 7, the supporting wall portion 26 is arranged at a position inwardly of an outer end surface of the movable panel 12. The front link member 50 is provided between the supporting wall portion 26 of the guide rail 20 and the drive shoe 40 in the vehicle width direction. Additionally, the rear support pin 66 serves as a rear supporting portion.

As illustrated in FIG. 4, the restriction block 80 is fixed on the guide rail 20 at a position in the vicinity of the front engagement pin 54 so as to be positioned between the bottom portion 21 and the third partition wall portion 24c in an up-and-down direction. Additionally, the front link member 50 and the drive shoe 40 are positioned between the inner wall portion 23 on the one hand and the inner vertical wall portion 25c and the third partition wall portion 24c in the vehicle width direction.

As illustrated in FIG. 5, the link member main body 61 of the rear link member 60 is positioned in the vicinity of the rear support pin 66 so as to be located between the inner wall portion 23 and the drive shoe 40 in the vehicle width direction. The rear support pin 66, which inwardly protrudes from the side surface of the link member main body 61, is inserted into a clearance formed at the supporting wall portion 26 (i.e. a clearance defined by the first, second and third supporting wall portions 26a, 26b and 26c).

Figure 6:
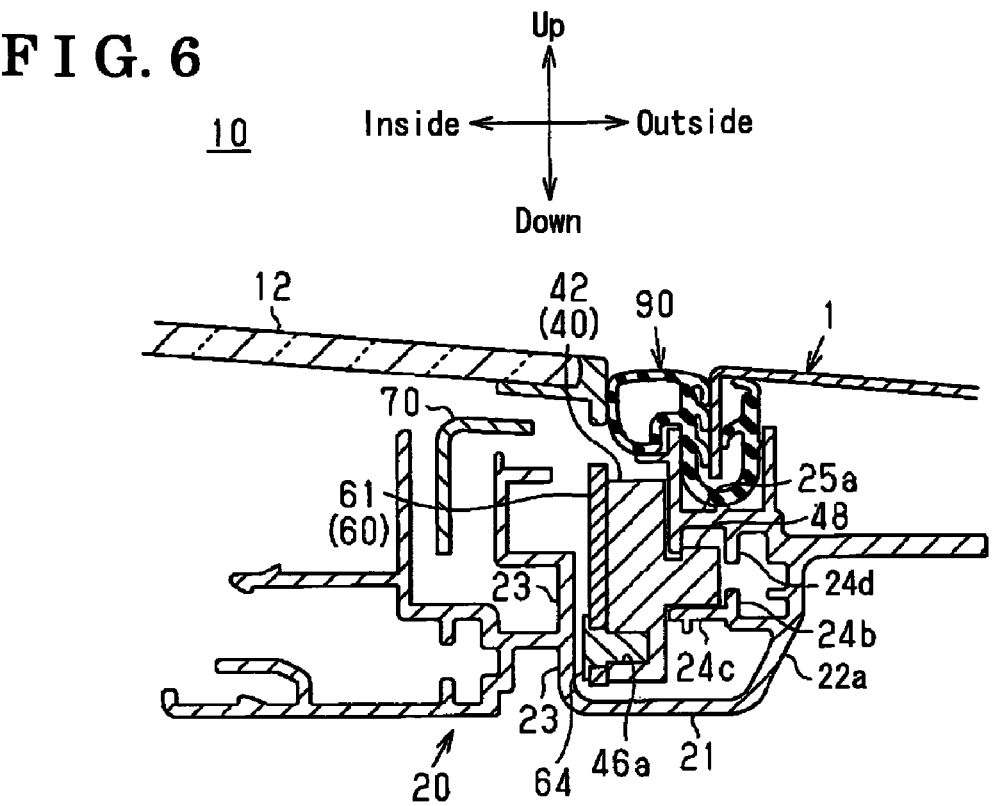
FIG. 6 is a cross-sectional diagram illustrating the configuration of the sun roof apparatus taken along line VI-VI in FIG. 2.

As illustrated in FIG. 6, the engagement protruding portion 48, which is provided at the side surface of the shoe main body 42 so as to outwardly protrude therefrom, is supported by the guide portion 27 at a position where the rear engagement pin 64 is provided. More specifically, an end portion of the engagement portion 48 is formed to be enlarged in an upward direction when comparing to a base end portion thereof, so that the end portion engages with the inner vertical wall portion 25c. Accordingly, a displacement of the drive shoe 40 in the vehicle width direction and in the up-and-down direction may become avoidable.

Figure 7:
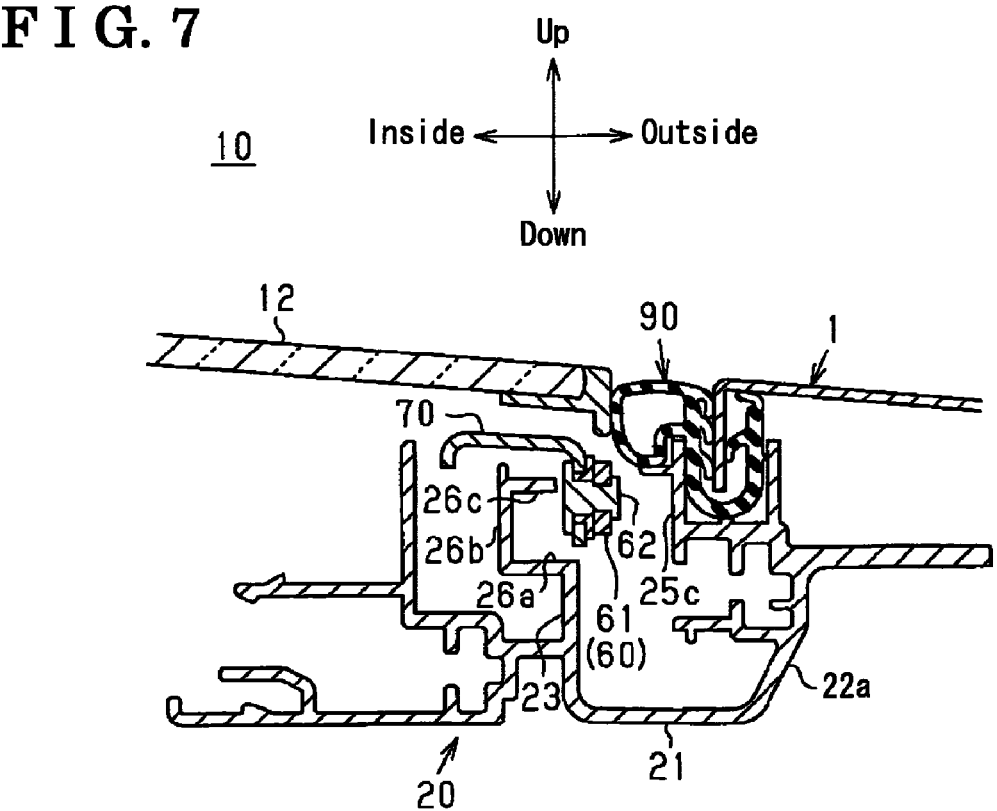
FIG. 7 is a cross-sectional diagram illustrating the configuration of the sun roof apparatus taken along line VII-VII in FIG. 2.

The rear engagement pin 64 of the rear link member 60 is inserted into the rear longitudinal groove 46a of the drive shoe 40. As illustrated in FIG. 7, the functional bracket 70 is located inwardly of the rear link member 60 at a position where the connecting pin 62 is provided and is connected to the rear link member 60 via the rear connecting pin 62.

A configuration of the weather strip 90 will be described below with reference to FIG. 8. A state of the weather strip 90 before being attached is indicated by a chain double-dashed line in FIG. 8. The weather strip 90 has a substantially same shape as the weather strip 90 illustrated in FIG. 2.

Figure 8:
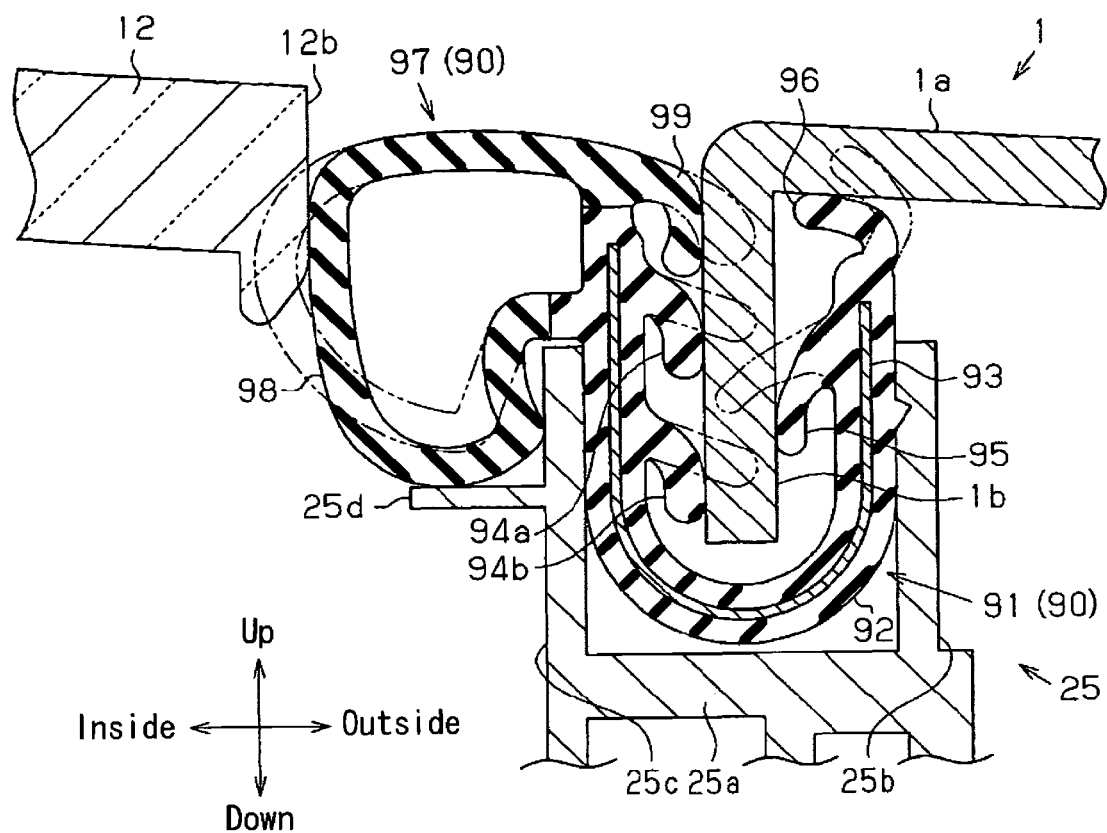
FIG. 8 is a cross-sectional diagram illustrating the configuration of the sun roof apparatus centering on the weather strip when being viewed in the vehicle width direction.

As illustrated in FIG. 8, the weather strip 90 made of a rubber material includes a base portion 91 enclosing the flange portion 1b of the roof panel 1. The base portion 91 is supported from a bottom thereof by means of the holding portion 25.

More specifically, the base portion 91 is formed to have a U-shape in cross section and to have a base portion main body 92, whose inner end portion (i.e. a left upper end portion of the base portion 91 in FIG. 8) is connected with a sealing portion 97, and a core 93 embedded into the base portion main body 92 and having a U-shape in cross section. The inner vertical wall portion 25c is positioned inwardly of the flange portion 1b. On the other hand, the outer vertical wall portion 25b is positioned outwardly of the flange portion 1b. Additionally, plural protrusions (first and second inner protrusions 94a and 94b, and an outer protrusion 95), which extend in a diagonally downward direction from an inner circumferential surface of the base portion main body 92, are formed on the base portion 91. Furthermore, an upper protrusion 96 is formed at an outer end portion of the base portion main body 92 (i.e. at a right upper end portion of the base portion main body 92 in FIG. 8).

The sealing portion 97 is formed to have a substantially C-shape in cross section and to include a sealing portion main body 98, whose both end portions are connected to the base portion main body 92, and a protruding portion 99, which is connected to the sealing portion main body 98. An inner space is defined by an inner circumferential surface of the sealing portion main body 98 and an outer circumferential surface of the base portion main body 92.

The sealing portion 97 is formed to contact an outer circumferential surface of the sealing portion main body 98, specifically, a side surface of the sealing portion 97 contacts the right edge portion 12b of the movable panel 12 while the movable panel 12 is in the fully-closed state. Furthermore, while the sealing portion 97 is deformed by being pushed by the movable panel 12, a lower surface of the sealing portion main body 98 contacts an upper surface of the inwardly extending portion 25d.

Figure 9:
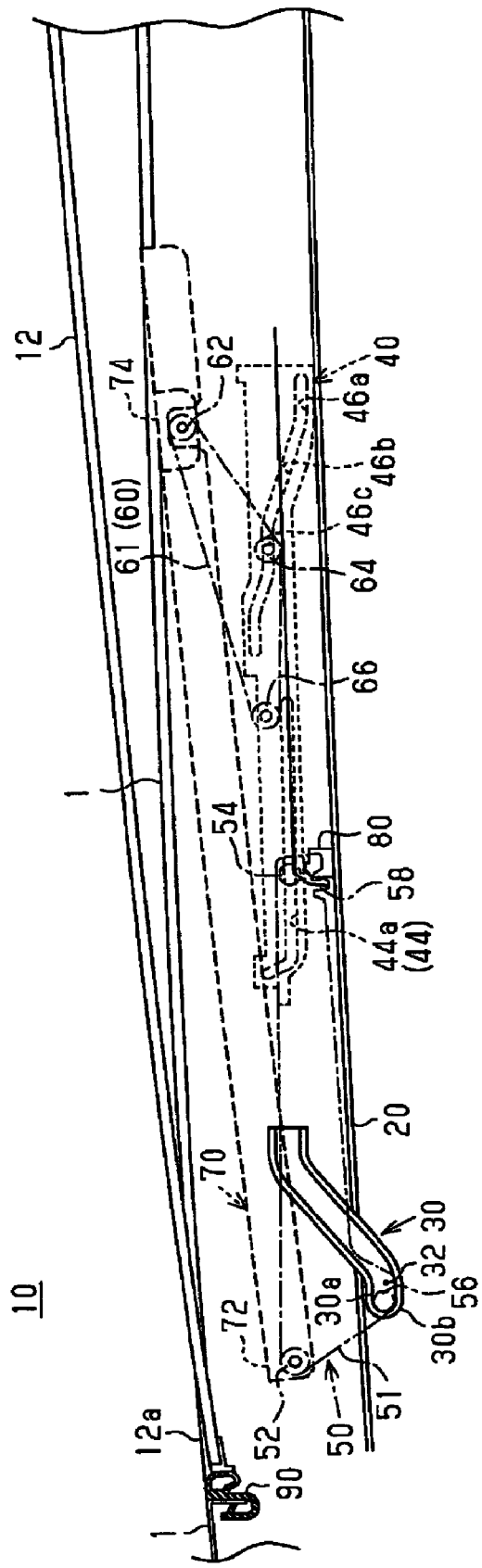
FIG. 9 is a cross-sectional diagram illustrating the configuration of the sun roof apparatus centering on the movable panel in a state where a tilt-up operation is completed when being viewed in the vehicle width direction.

A tilt-up operation of the movable panel 12 will be described below with reference to FIG. 9. Illustrated in FIG. 9 is a vertical sectional view of the sun roof apparatus 10 centering on the movable panel 12 in a state where the tilt-up operation is completed. As is the case with FIG. 2, different components are indicated by different types of lines.

As illustrated in FIG. 9, in a case where the drive shoe 40 is rearwardly moved while the sun roof apparatus 10 is in the fully-closed state, the front engagement pin 54 is relatively displaced within the rear groove 44a of the first groove portion 44 in a forward direction in response to the movement of the drive shoe 40. However, in this stage, the front link member 50 is not actually displaced in the rearward direction even if the drive shoe 40 is rearwardly moved.

On the other hand, in this case, the rear engagement pin 64 is relatively and forwardly moved within the rear longitudinal groove 46a, the inclined rear groove 46b and the intermediate longitudinal groove 46c of the second groove portion 46 in the above-mentioned order. The second groove portion 46 is formed to extend diagonally upwardly towards the front end portion thereof. Therefore, the rear engagement pin 64 is upwardly displaced in response to the displacement of the drive shoe 40 in the rearward-direction. Furthermore, the rear link member 60 is rotated about the rear support pin 66 in a counterclockwise direction in FIG. 9 without being displaced in the rearward direction. In other words, the rear link member 60 upwardly lifts the rear end portion of the functional bracket 70 in a manner where the rear support pin 66 is guided by the supporting wall portion 26 of the guide rail 20 and the rear engagement pin 64 is guided by the second groove portion 46 to be displaced.

Accordingly, the functional bracket 70 rotates about the front rotating portion 72 in the counterclockwise direction so as to lift up the rear end portion of the functional bracket 70 without being displaced in the rearward direction. In other words, the functional bracket 70 performs the tilt-up operation in the above-described manner.

Until the tilt-up operation is completed from the fully-closed state, the upper support surface 30*a* and the lower support surface 30*b* of the front groove portion 32 are closely located upwardly and downwardly of the front support pin 56, respectively. Therefore, the front support pin 56 is upwardly and downwardly supported by the front guide member 30 in the vertical direction.

The movable panel 12 is rotated about the front connecting pin 52 in response to the tilt-up operation. Therefore, in a process of the movable panel 12 being rotated, the front edge portion 12*a* of the movable panel 12 forwardly and downwardly presses the weather strip 90, which is arranged in front of the front edge portion 12*a* in the front-rear direction. Generally, in a case where the weather strip 90 is repeatedly pushed with large force applied thereto, the weather strip 90 deteriorates. In order to avoid the deterioration of the weather strip 90, the flange portion 1*b* of the roof panel 1 may need to be forwardly displaced.

However, according to this embodiment, the sun roof panel 10 is configured so that the front connecting pin 52 is located between the front edge portion 12*a* and the front support pin 56 in the front-rear direction and is located between the front edge portion 12*a* and the front support pin 56 in the up-and-down direction while the movable panel 12 is in the fully-closed state, so that the deterioration of the weather strip 90 is reduced.

A pop-up operation of the movable panel 12 will be described below with reference to FIG. 10. Furthermore, a slide operation of the movable panel 12 will be described below with reference to FIG. 11. The pop-up operation is carried out before the slide operation of the movable panel 12. Furthermore, in the pop-up operation, the front edge portion 12*a* of the movable panel 12 is further raised while rearwardly moving the movable panel 12 from a state thereof where the tilt-up operation is completed.

Figure 10:
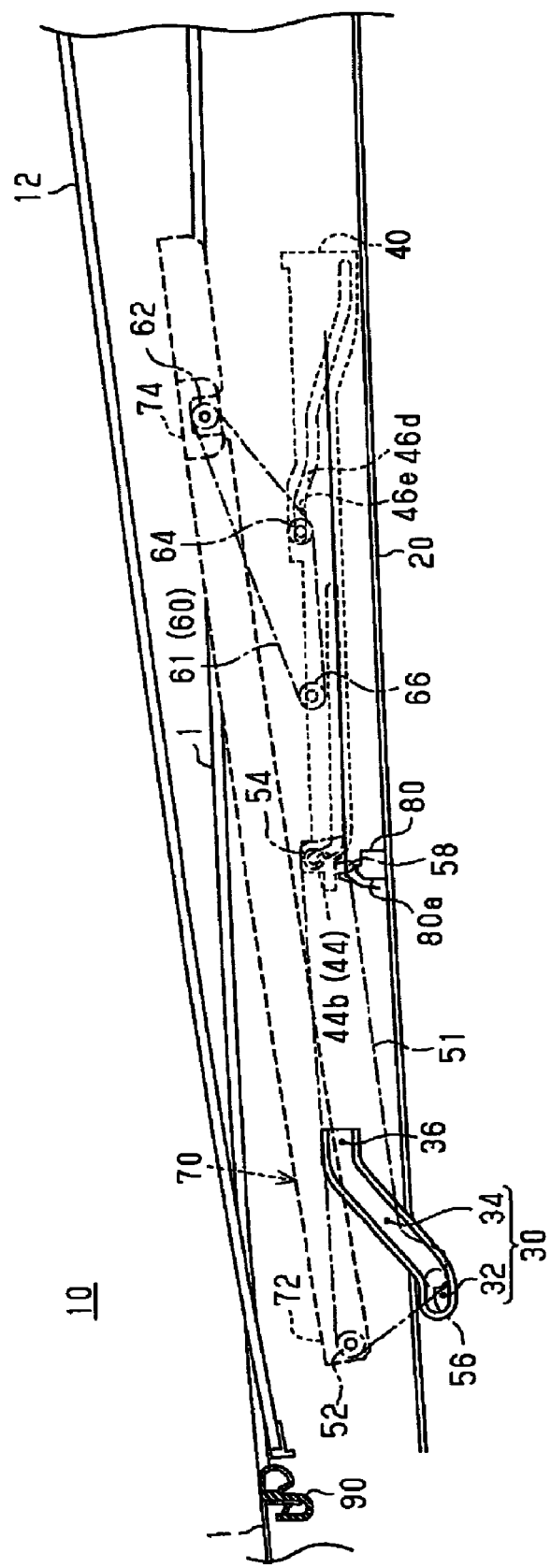
FIG. 10 is a cross-sectional diagram illustrating the configuration of the sun roof apparatus centering on the movable panel in a process of a pop-up operation when being viewed in the vehicle width direction.
Figure 11:
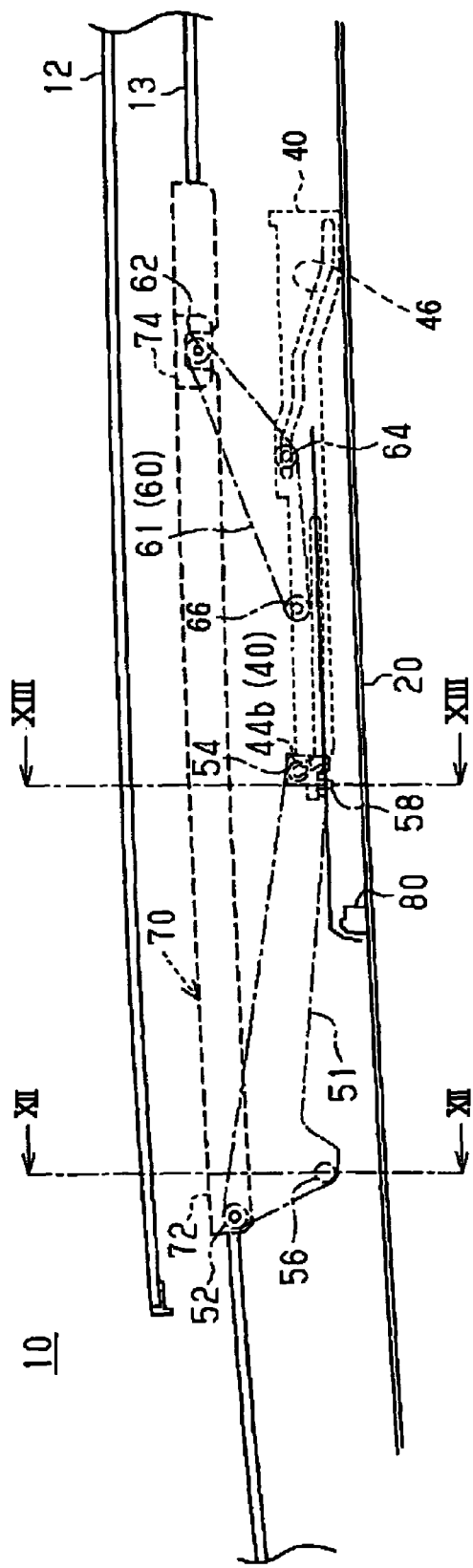
FIG. 11 is a cross-sectional diagram illustrating the configuration of the sun roof apparatus centering on the movable panel in a state where a slide operation is completed when being viewed in the vehicle width direction.

Illustrated in FIG. 10 is the cross-sectional diagram of the sun roof apparatus 10 centering on the movable panel 12 in a process of the pop-up operation when being viewed in the vehicle width direction. Illustrated in FIG. 11 is the cross-sectional diagram of the sun roof apparatus 10 centering on the movable panel 12 in a state where the slide operation is completed when being viewed in the vehicle width direction. As is the case with FIG. 2, different types of lines are used for different components of the sun roof apparatus 10.

As illustrated in FIG. 10, in a case where the drive shoe 40 is rearwardly displaced from the state where the tilt-up operation is completed, the front engagement pin 54 is relatively displaced from the rear groove 44*a* to the front grove 44*b* of the first groove portion 44 and is eventually displaced to the front end portion of the front groove 44*b* in response to the rearward displacement of the drive shoe 40. In this case, the restriction pin 58 is displaced in the diagonally rearward and upward direction along the guide surface 80*b* of the restriction block 80. Furthermore, in this case, the front support pin 56 is rearwardly displaced within the front groove portion 32 so as to be displaced up to the rear end portion of the front groove portion 32. Accordingly, the front link member 50 is rotated about the front support pin 56 in the counterclockwise direction while being rearwardly displaced. In other words, the front link member 50 lifts the front end portion of the functional bracket 70 in a manner that the front engagement pin 54 is guided by the first groove portion 44 of the drive shoe 40 and the front support pin 56 is guided by the front guide member 30 so as to displace the front link member 50.

On the other hand, in this case, the rear engagement pin 64 is relatively and forwardly moved within the inclined front groove 46*d* and the front longitudinal groove 46*e* in the above-mentioned order so that the rear engagement pin 64 is eventually moved up to the front end portion of the front longitudinal groove 46*e*. As described above, the second groove portion 46 is formed so as to extend in the diagonally upward towards the front portion thereof. Therefore, in the case where the drive shoe 40 is rearwardly displaced, the rear engagement pin 64 is upwardly displaced in response to the rearward displacement of the drive shoe 40. Accordingly, the rear link member 60 is rotated about the rear support pin 66 in the counterclockwise direction while being rearwardly displaced.

Accordingly, the functional bracket 70 is rotated about the front rotating portion 72 in the counterclockwise direction so that the rear end portion thereof is lifted up while the functional bracket 70 is rearwardly displaced. According to the embodiment, because the front engagement pin 54 is engaged with the front end portion of the front groove 44*b*, in the case where the drive shoe 40 is further rearwardly displaced from the state indicated in FIG. 10, the front link member 50 is also further rearwardly displaced in response to the rearward displacement of the drive shoe 40. Furthermore, in this case, the front support pin 56 is rearwardly displaced within the inclined groove portion 34 and the rear groove portion 36 of the front guide member 30 in the above-mentioned order, so that the front support pin 56 is displaced up to the rear end portion of the rear groove portion 36. Accordingly, the front link member 50 is rotated about the front engagement pin 54 in a clockwise direction in FIG. 10 while the front link member 50 is rearwardly displaced.

On the other hand, in this case, the rear link member 60 is rearwardly displaced in response to the rearward displacement of the drive shoe 40. Accordingly, the functional bracket 70 is rotated about the rear rotating portion 74 in the clockwise direction, so that the front end portion of the functional bracket 70 is lifted up while being rearwardly displaced. As a result, the movable panel 12 is turned to be in a state where the movable panel 12 extends along the roof panel 1 in the front-rear direction, hence, the pop-up operation is completed.

As illustrated in FIG. 11, in a case where the drive shoe 40 is further rearwardly displaced from the state where the pop-up operation is completed, the movable panel 12 is rearwardly slid in response to the rearward displacement of the drive shoe 40.

A positional relationship between the guide rail and each component will be described below in detail with reference to FIGS. 12 and 13.

Figure 12:
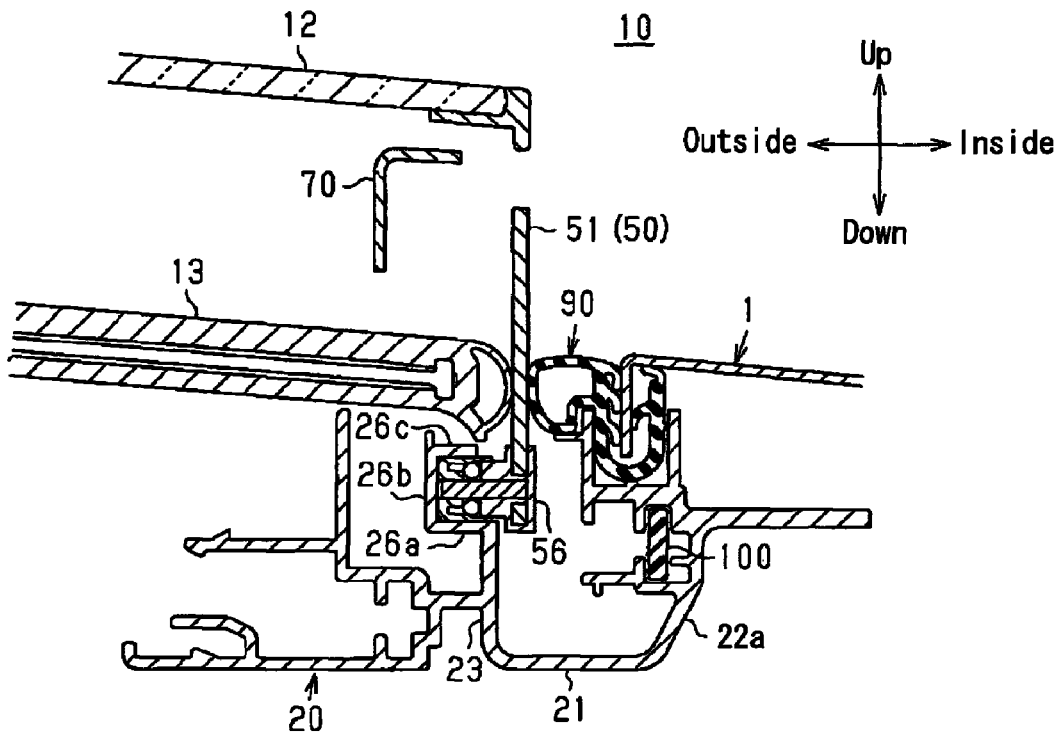
FIG. 12 is a cross-sectional diagram illustrating the configuration of the sun roof apparatus taken along line XII-XII in FIG. 11.

As illustrated in FIG. 12, the front support pin 56 is inserted into a recess formed at the support wall portion 26. The support wall portion 26 is connected to the rear end portion of the rear groove portion 36 of the front guide member 30. Therefore, the front support pin 56 is allowed to be moved from the rear groove portion 36 to the support wall portion 26. As illustrated in FIG. 12, the front support pin 56 of the front link member 50 is located inwardly of the outer end surface of the movable panel 12.

Figure 13:
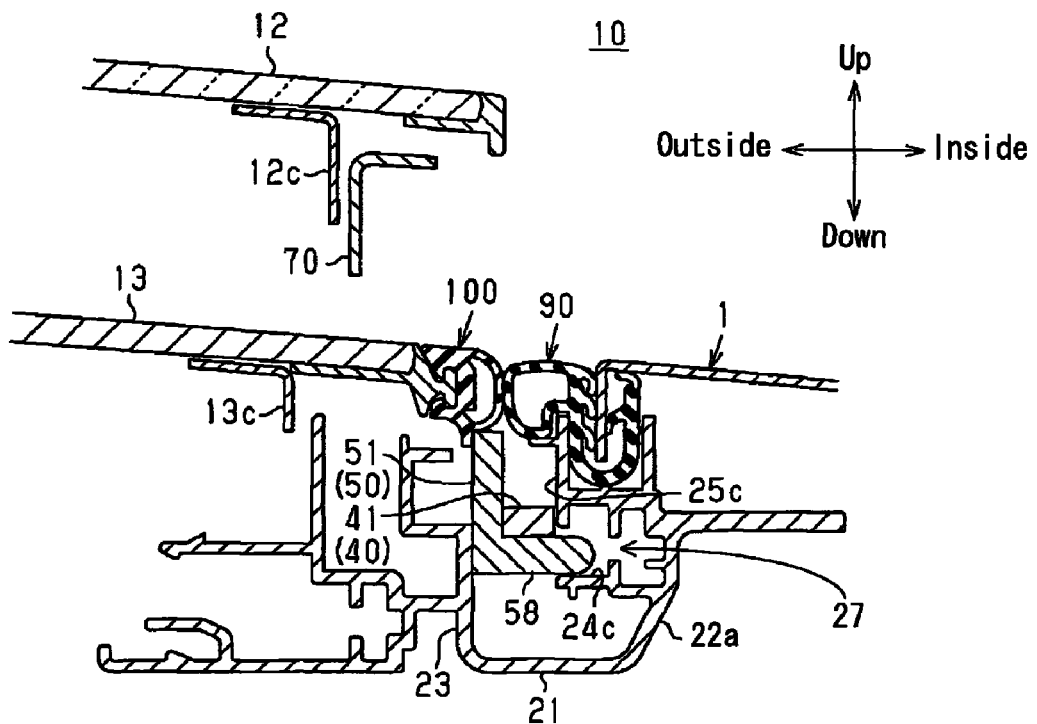
FIG. 13 is a cross-sectional diagram illustrating the configuration of the sun roof apparatus taken along line XIII-XIII in FIG. 11.

As illustrated in FIG. 13, the restriction pin 58, which outwardly protrudes from a lower portion of the front link member 50, is supported by the guide portion 27. In this case, a lower surface of the shoe main body 42 contacts an upper surface of the restriction pin 58.

In the first embodiment, the restriction pin 58 serves as a restriction protruding portion. The rear link member 60 serves as a lifting mechanism.

As described above, following advantages and merits may be obtained. According to the first embodiment, both of the supporting wall portion 26 of the guide rail 20 and the front support pin 56 of the front link member 50 are located inwardly of the outer end surface of the movable panel 12. Furthermore, the drive shoe 40 is provided downward of the weather strip 90. Still further, the front link member 50 is positioned between the supporting wall portion 26 of the guide rail 20 and the drive shoe 40 in the vehicle width direction. Accordingly, because the front support pin 56, which controls the displacement of the front link member 50 in the vertical direction, is located inwardly of the outer end surface of the movable panel 12, the front support pin 56 is not likely to interfere with the weather strip 90. In other words, a shape of the weather strip 90 is avoided from being restricted by the front link member 50. Hence, an excessive interference between the front link member 50 and the weather strip 90 may be avoided even in a case where the attachment state of the weather strip 90 relative to the flange portion 1b, which extends in the front-rear direction of the roof panel 1, is changed.

In this embodiment, the front support pin 56 is provided so as to inwardly protrude from the link member main body 51b. Accordingly, the front support pin 56 is accurately and properly controlled so as not to interfere with the drive shoe 40.

According to the first embodiment, the drive shoe 40 includes the engagement protruding portion 48, which outwardly protrudes from the shoe main body 42. The guide portion 27, which is configured so as to be provided right below the shoe main body 90, more specifically, right below the holding portion 25 and so as to engage with the engagement protruding portion 48 in order to guide the drive shoe 40, is formed at the guide rail 20. Accordingly, a space defined below the holding portion 25 may be effectively used, so that an increase of a size of the guide rail 20 in the vehicle width direction is appropriately regulated.

According to the first embodiment, the belt supporting portion 28, which is configured so as to support the belt 100 driving the drive shoe 40 in the outward direction relative to the guide portion 27 in the vehicle width direction, is formed at the guide rail 20 at the position right below the weather strip 90, more specifically, right below the holding portion 25. Accordingly, the space formed blow the holding portion 25 may be effectively used, so that the increase of the size of the guide rail 20 in the vehicle direction is appropriately regulated.

According to the first embodiment, the front link member 50 includes the restriction pin 58, which outwardly protrudes from the link member main body 51b, at the position forward and downward of the front engagement pin 54. The restriction surface 80a, which is configured so as to be positioned rearwardly of the restriction pin 58 in order to control (restrict) the rearward movement of the front link member 50 while the movable panel 12 is in the fully-closed state, and the guide surface 80b, which is configured so as to guide the restriction pin 58 to be displaced in response to an opening and closing operation of the movable panel 12, are formed at the guide rail 20. Furthermore, the guide portion 27 is connected at the rear end portion of the guide surface 80b. According to the above-mentioned configuration, while the movable panel 12 is in the fully-closed state, the displacement of the restriction pin 58 in the rearward direction is regulated by the restriction surface 80a. Furthermore, the restriction pin 58 is guided by the guide surface 80b and the guide portion 27 so as to be displaced when the movable panel 12 is opened and closed. Therefore, the restriction surface 80a restricting the displacement of the front link member 50, the guide surface 80b guiding the front link member 50, and the guide portion 27 guiding the drive shoe 40 to be displaced are arranged at the same position in the vehicle width direction. Accordingly, the increase of the size of the guide rail 20 in the vehicle width direction may be appropriately restricted.

According to the first embodiment, the holding portion 25, which holds the weather strip 90, is provided at the guide rail 20 so as to be located right below the flange portion 1b of the roof panel 1. Accordingly, because the holding portion 25 is provided right below the flange portion 1b, an appropriate positional arrangement between the weather strip 90 and the holding portion 25 on the one hand and the front link member 50 on the other hand may be achieved even in a case where the sun roof apparatus 10 according to the first embodiment is adapted to a sun roof apparatus which is configured so that the space defined below the holding portion 25 is limited.

According to the first embodiment, the link member main body 51b includes the front engagement pin 54 and the front support pin 56. Furthermore, the link member main body 51b is positioned outwardly of the front guide member 30. The front connecting pin 52 defines the front end portion of the front link member 50 and is positioned inwardly of the front guide member 30. Accordingly, the front connecting pin 52, which is positioned at the front end portion of the front link member 50, is displaced inwardly relative to the link member main body 51b having the front engagement pin 54 and the front support pin 56. Therefore, when comparing to a sun roof apparatus that is configured so that a front connecting pin positioned at a front end portion of a front link member is not inwardly displaced relative to a link member main body having a front engagement pin and a front support pin, a shape of a front end portion of the sun roof apparatus 10 according to the first embodiment, specifically, the front housing 110, which connects the front end portions of the respective guide rails 20 that are arrange so as to keep the distance therebetween in the vehicle width direction, may be formed so that the curved portion 113 has a larger curvature radius. Accordingly, a weight of the front housing 110 may be reduced. As a result, a design flexibility of the front housing 110 may be increased.

According to the first embodiment, the guide rail 20 is configured so that the front support pin 56 of the front link member 50 and the rear support pin 66 are both supported by the single supporting wall portion 26. More specifically, the front support pin 56 of the front link member 50 is supported by the front portion of the supporting wall portion 26, which is formed at the guide rail 20, and the rear support pin 66 of the rear link member 60 is supported by the rear portion of the supporting wall portion 26. Accordingly, when comparing to a configuration where a portion of supporting the front support pin and a portion of supporting the rear support pin are spaced away from each other in the vehicle width direction, the sun roof apparatus 10 according to the first embodiment may be configured so that the size of the guide rail 20 in the vehicle width direction is appropriately controlled so as not to be increased.

Second Embodiment

A second embodiment of a sun roof apparatus 210 will be described below with reference to FIGS. 14 to 17.

The sun roof apparatus 210 according to the second embodiment differs from the sun roof apparatus 10 according to the first embodiment in that a groove shape of a front guide member 230, a groove shape of a drive shoe 240 and a shape of a front link member 250 differ from the corresponding components of the sun roof apparatus 10 according to the first embodiment. In other words, the sun roof apparatus 210 according to the second embodiment differs from the sun roof apparatus 10 according to the first embodiment in that the sun roof apparatus 210 includes a front rotating pin 259. In the second embodiment, only the differences between the sun roof apparatus 10 according to the first embodiment and the sun roof apparatus 210 according to the second embodiment will be mainly described. Additionally, components of the sun roof apparatus 210 identical to or corresponding to the components of the sun roof apparatus 10 according to the first embodiment will be indicated with reference numerals in 200. More specifically, the identical or corresponding components of the sun roof apparatus 10 are assigned with the corresponding reference number increased by 200, and the detailed description of the components of the sun roof apparatus 210 identical or corresponding components of the sun roof apparatus 10 will be omitted.

Figure 14:
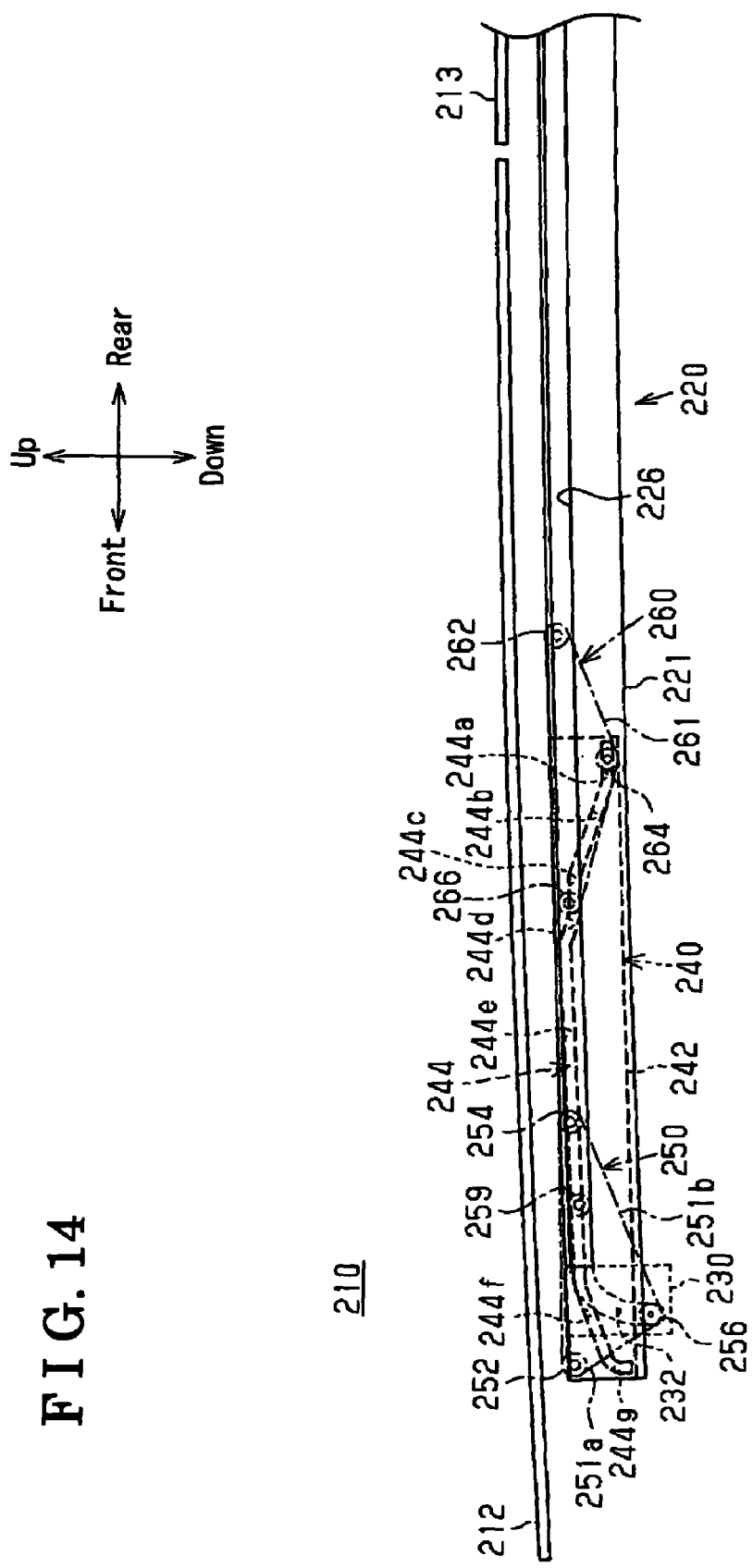
FIG. 14 is a cross-sectional diagram illustrating a configuration of a sun roof apparatus according to a second embodiment centering on a movable panel in a fully-closed state when being viewed in the vehicle width direction.

Illustrated in FIG. 14 is cross-sectional diagram of a configuration of the sun roof apparatus 210 in the fully-closed state centering on a movable panel 212 when being viewed in the vehicle width direction. In FIG. 14, different types of lines are used to indicate different components. Additionally, in order to facilitate the explanation, the functional bracket is not illustrated in FIG. 14.

As illustrated in FIG. 14, a curved groove 232 is formed at the front guide member 230 so as to extend while rearwardly and upwardly curving. A front support pin 256 is inserted into a lower end portion of the curved groove 232.

A groove portion 244 is formed on an inner side surface of a shoe main body 242 in the vehicle width direction so as to extend in the front-rear direction. The groove portion 244 includes a first longitudinal groove 244a extending in the front-rear direction, a first inclined groove 244b, which is continuously connected to a front end portion of the first longitudinal groove 244a and which extends in the diagonally forward and upward direction, a second longitudinal groove 244c, which is continuously connected to a front end portion of the first inclined groove 244b and which extends in the front-rear direction, and a second inclined groove 244d, which is continuously connected to a front end portion of the second longitudinal groove 244c and which extends in the diagonally forward and upward direction. Furthermore, the groove portion 244 includes a third longitudinal groove 244e, which is continuously connected to a front end portion of the second inclined groove 244d and which extends in the front-rear direction, a third inclined groove 244f, which is continuously connected to a front end portion of the third longitudinal groove 244e and which extends in a diagonally forward and downward direction, and a vertical groove 244g, which is continuously connected to a front end portion of the third inclined groove 244f and which extends in the downward direction therefrom. A rear end portion of the first longitudinal groove 244a and a lower end portion of the vertical groove 244g are both closed.

The front rotating pin 259 is provided at a link member main body 251b of the front link member 250 so as to be positioned between a front connecting pin 252 and a front engagement pin 254 in the front-rear direction. The front engagement pin 254 is inserted into the third longitudinal groove 244e. A rear engagement pin 264 is inserted into the first longitudinal groove 244a.

The front rotating pin 259 and a rear support pin 266 are supported by a support wall portion 226 of each of guide rails 220. The tilt-up operation of the movable panel 212 will be described below with reference to FIG. 15.

Figure 15:
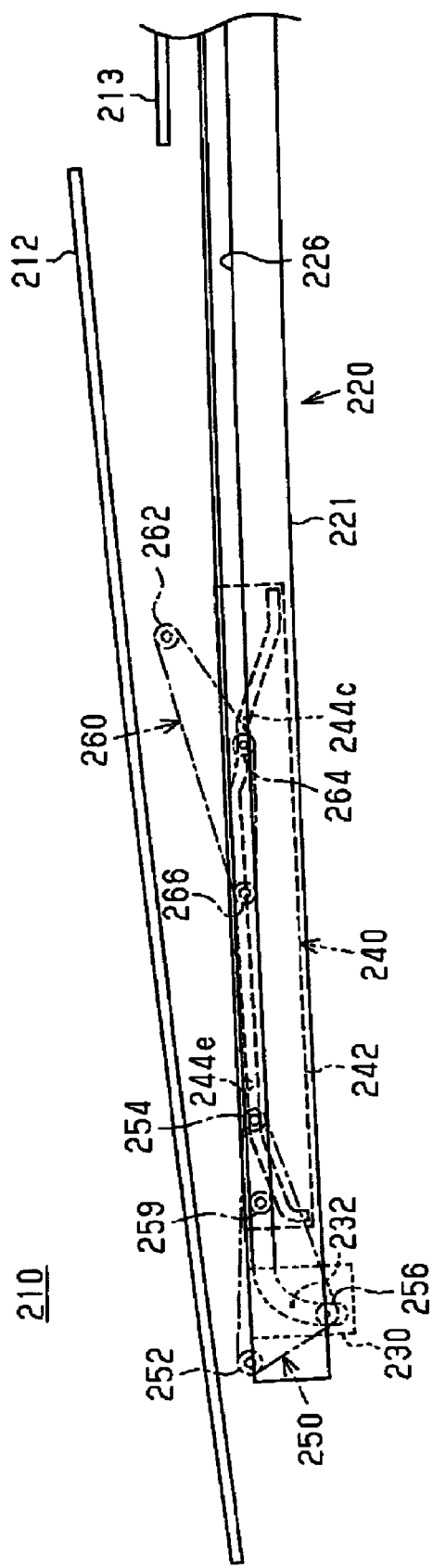
FIG. 15 is a cross-sectional diagram illustrating the configuration of the sun roof apparatus centering on the movable panel in a state where the tilt-up operation is completed when being viewed in the vehicle width direction.

Illustrated in FIG. 15 is a cross-sectional diagram of a configuration of the sun roof apparatus 21 centering on the movable panel 212 in a state where the tilt-up operation is completed when being viewed in the vehicle width direction. As is the case with FIG. 2, different types of lines are used to indicate different components.

As illustrated in FIG. 15, in a case where the drive shoe 240 is rearwardly displaced from a position thereof during the fully-closed state, the front engagement pin 254 is relatively displaced within the third longitudinal groove 244e in the forward direction. However, in this case, the front link member 250 is not displaced in the rearward direction in practice even in the case where the drive shoe 240 is rearwardly moved.

On the other hand, the rear engagement pin 264 is relatively displaced within the first longitudinal groove 244a, the first inclined groove 244b and the second longitudinal groove 244c in the forward direction in the above-mentioned order. The first longitudinal groove 244a, the first inclined groove 244b and the second longitudinal groove 244c of the consecutive groove portion 244 are formed so as to upwardly extend towards a front portion thereof. Therefore, the rear engagement pin 264 is upwardly displaced in response to a rearward movement of the drive shoe 240. Furthermore, a rear link member 260 is rotated about the rear support pin 266 in a counterclockwise direction in FIG. 15 without being displaced in the rearward direction. In other words, the rear link member 260 lifts up a rear end portion of the movable panel 212 in a manner that the rear support pin 266 is guided by the supporting wall portion 226 of the guide rail 220 and the rear engagement pin 264 is guided by the groove portion 244 so as to be displaced.

Accordingly, the movable panel 212 is rotated about a front end portion thereof in the counterclockwise direction, so that the rear end portion of the movable panel 212 is displaced in the upward direction without being rearwardly displaced. In other words, the tilt-up operation of the movable panel 212 is carried out. The pop-up operation of the movable panel 212 will be described below with reference to FIG. 16.

Figure 16:
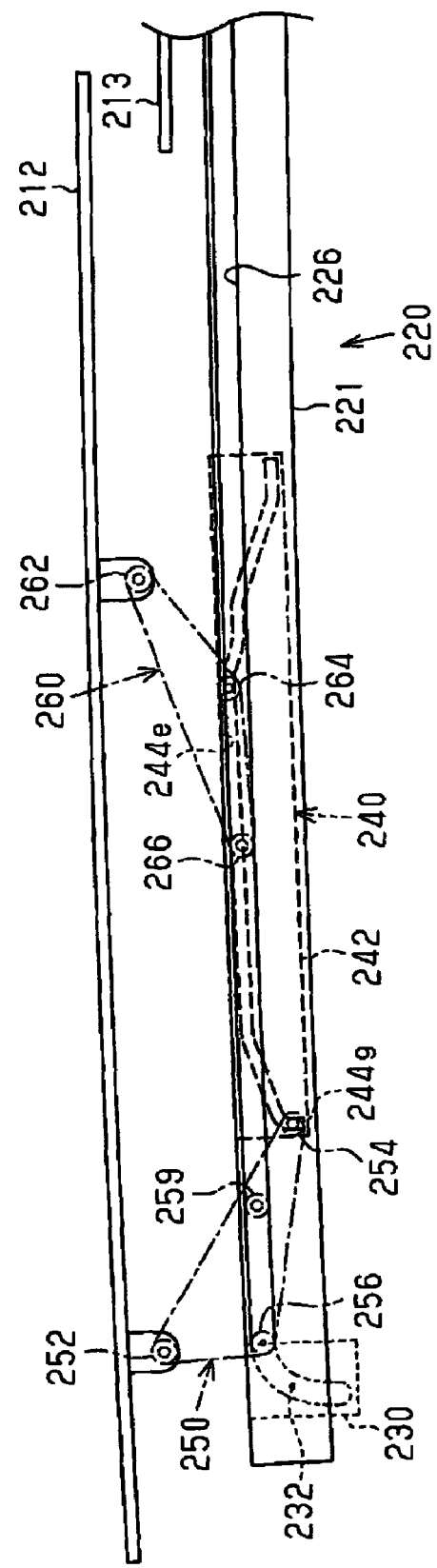
FIG. 16 is a cross-sectional diagram illustrating the configuration of the sun roof apparatus centering on the movable panel in a state where the pop-up operation is completed when being viewed in the vehicle width direction.

Illustrated in FIG. 16 is a cross-sectional diagram of the configuration of the sun roof apparatus 210 centering on the movable panel 212 in a state where the pop-up operation is completed when being viewed in the vehicle width direction. As is the case with FIG. 14, different types of lines are used for different components in FIG. 16.

As illustrated in FIG. 16, in a case where the drive shoe 240 is rearwardly moved from the state where the tilt-up operation is completed, the front engagement pin 254 is displaced within the third longitudinal groove 244e, the third inclined groove 244f to the vertical groove 244g and is eventually moved to the lower end portion of the vertical groove 244g in response to the rearward movement of the drive shoe 240. In this case, the front support pin 256 is displaced within the curved groove 232 in the rearward and upward direction, so that the front support pin 256 is displaced up to a rear end portion of the curved groove 232.

Accordingly, the front link member 250 is rotated about the front rotating pin 259 in the clockwise direction while being rearwardly displaced. In other words, the front link member 250 lifts up the front end portion of the movable panel 212 in a manner that the front engagement pin 254 is guided by the drive shoe 240 and the front support pin 256 is guided by the front guide member 230 so as to displace the movable panel 212.

On the other hand, the rear engagement pin 264 is relatively displaced within the second longitudinal groove 244c and the second inclined groove 244d in the forward direction in the above-mentioned order, so that the rear engagement pin 264 is eventually displaced to a rear end portion of the third longitudinal groove 244e. The second longitudinal groove 244c, the second inclined groove 244d and the third longitudinal groove 244e of the consecutive groove portion 244 are formed so as to upwardly extend in the forward direction. Therefore, in the case where the drive shoe 240 is rearwardly moved, the rear engagement pin 264 is upwardly displaced in response to the rearward movement of the drive shoe 240. As a result, the rear link member 260 is rotated about the rear support pin 266 in the counterclockwise direction while being rearwardly displaced.

Accordingly, the movable panel 212 is turned to be in a state where the movable panel 212 extends along a fixing panel 213 in the front-rear direction while being rearwardly displaced. Consequently, the pop-up operation is completed. In a case where the drive shoe 240 is further rearwardly displaced from the state illustrated in FIG. 16, the movable panel 212 is rearwardly slid as illustrated in FIG. 17.

As described above, the following advantages and merits similar to the first embodiment may be achieved.

Third Embodiment

A third embodiment of a sun roof apparatus 310 will be described below with reference to FIGS. 18 to 21.

The sun roof apparatus 310 according to the third embodiment differs from the run roof apparatus 10 according to the first embodiment in that a shape of a groove formed on a front guide member 330 and a configuration of a front link member 350 differ from the corresponding components of the first embodiment. More specifically, the sun roof apparatus 310 according to the third embodiment differs from the run roof apparatus 10 according to the first embodiment in that the sun roof apparatus 310 includes a front rotating pin 359. Furthermore, the sun roof apparatus 310 according to the third embodiment differs from the run roof apparatus 210 according to the second embodiment in that a shape of a groove formed at a drive shoe 340 and the configuration of the front link member 350 differ from the corresponding components of the second embodiment. In the third embodiment, only the differences between the sun roof apparatus 310 of the third embodiment on the one hand and the second and third embodiment on the other hand will be described. Additionally, components of the sun roof apparatus 310 identical to or corresponding to the components of the sun roof apparatus 10 according to the first embodiment will be indicated with reference numerals in 300. More specifically, the identical or corresponding components of the sun roof apparatus 10 are assigned with the corresponding reference number increased by 300, and the detailed description of the components of the sun roof apparatus 310 identical or corresponding components of the sun roof apparatus 10 will be omitted.

Figure 18:
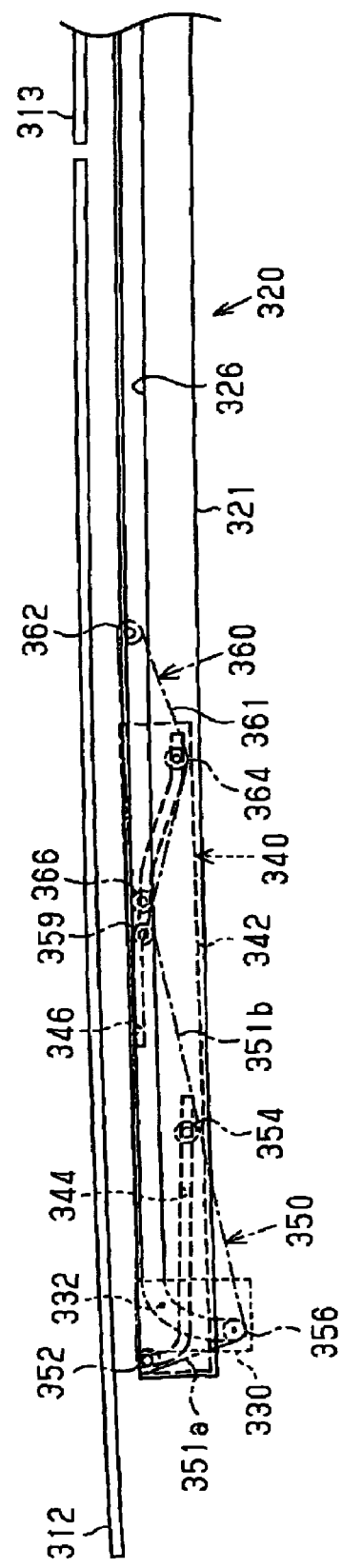
FIG. 18 is a cross-sectional diagram illustrating a configuration of a sun roof apparatus according to a third embodiment centering on a movable panel in the fully-closed state when being viewed in the vehicle width direction.

Illustrated in FIG. 18 is a longitudinal cross-sectional diagram of the sun roof apparatus 310 centering on a movable panel 312 in the fully-closed state when being viewed in the vehicle width direction. Different components are indicated by different types of lines in FIG. 18 in order to facilitate an explanation. Additionally, the functional bracket is not illustrated in FIG. 18 in order to facilitate the explanation.

As illustrated in FIG. 18, the front guide member 330 essentially has the same configuration as the front guide member 230 of the second embodiment. The drive shoe 240 is configured so that a first groove portion 344 and a second groove portion 346, which are formed to have essentially the same shapes as the respective first groove portion 44 and the second groove portion 46 of the first embodiment, are formed on an inner side surface of a shoe main body 342.

The front link member 350 is formed in a substantially flat plate shape having triangular shape in a plane view. While the sun roof apparatus 310 is in the fully-closed state, the front link member 350 is turned to be in a state where a portion thereof extending in a longitudinal direction thereof extends along the front-rear direction.

The front link member 350 includes a link member front portion 351a, at which a front connecting pin 352 is provided, a link member main body 351b, at which a front engagement pin 354, a front support pin 356 and the front rotating pin 359 are provided, and a link member connecting portion connecting the link member front portion 351a and the link member main body 351b.

The front connecting pin 352 is provided in the vicinity of an apex located at the foremost position among three apexes of the front link member 350 so as to inwardly protrude from a side surface of the link member front portion 351a in the vehicle width direction. The front rotating pin 359 is provided in the vicinity of another apex located at the rearmost position among the three apexes of the front link member 350 so as to inwardly protrude from the inner side surface of the link member main body 351b in the vehicle width direction. Furthermore, the front rotating pin 359 is supported by a supporting wall portion 326 of each of guide rails 320.

The front support pin 356 is provided in the vicinity of an apex located between the front connecting pin 352 and the front rotating pin 359 in the front-rear direction and downwardly of the front connecting pin 352 and the front rotating pin 359 so as to inwardly protrude from the inner side surface of the link member main body 351b in the vehicle width direction. Furthermore, the front support pin 356 is inserted into the front guide member 330. While the sun roof apparatus 310 is in the fully-closed state, the front support pin 356 is located within a curved groove 332, more specifically, at a lower end portion of the curved groove 332.

The front engagement pin 354 is provided at a side surface of the link member main body 351b so as to be positioned between the front support pin 356 and the front engagement pin 354 in the front-rear direction and in the up-and-down direction and so as to outwardly protrude from the side surface of the link member main body 351b in the vehicle width direction. The front engagement pin 354 is inserted into the first groove portion 344 of the drive shoe 340 so as to be rotatable relative to the drive shoe 340. While the sun roof apparatus 310 is in the fully-closed state, the front engagement pin 354 is located within a rear groove 344a, more specifically, at a rear end portion of the rear groove 344a.

A rear support pin 366 is supported by the supporting wall portion 326 of the guide rail 320.

The tilt-up operation of the movable panel 312 will be described below with reference to FIG. 19

Figure 19:
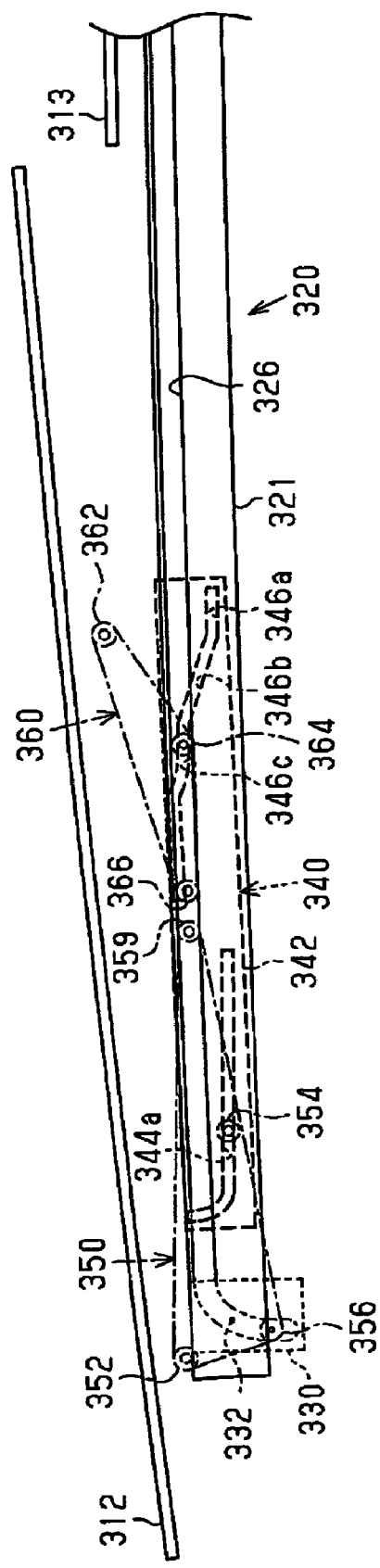
FIG. 19 is a cross-sectional diagram illustrating the configuration of the sun roof apparatus centering on the movable panel in a state where the tilt-up operation is completed when being viewed in the vehicle width direction.

Illustrated in FIG. 19 is the sun roof apparatus 310 centering on the movable panel 312 in a state where the tilt-up operation is competed when being viewed in the vehicle width direction. As is the case with FIG. 18, different components are indicated by different types of lines in FIG. 19.

As illustrated in FIG. 19, in a case where the drive shoe 340 is rearwardly displaced from the fully-closed state, the front engagement pin 354 is relatively displaced within the rear groove 344a in the forward direction in response to the rearward movement of the drive shoe 340. On the other hand, a rear engagement pin 364 is relatively displaced within a rear longitudinal groove 346a, a rear inclined groove 346b and an intermediate longitudinal groove 346c in the forward direction in the above-mentioned order so as to be upwardly displaced. Furthermore, a rear link member 360 is rotated about the rear support pin 366 in a counterclockwise direction in FIG. 19 without being rearwardly displaced. Accordingly, a rear end portion of the movable panel 312 is lifted up.

Accordingly, the movable panel 312 is rotated about a front end portion thereof in the counterclockwise direction without being rearwardly displaced, so that the rear end portion of the movable panel 312 is upwardly displaced. In other words, the tilt-up operation is performed. The pop-up operation of the movable panel 312 will be described below with reference to FIG. 20.

Figure 20:
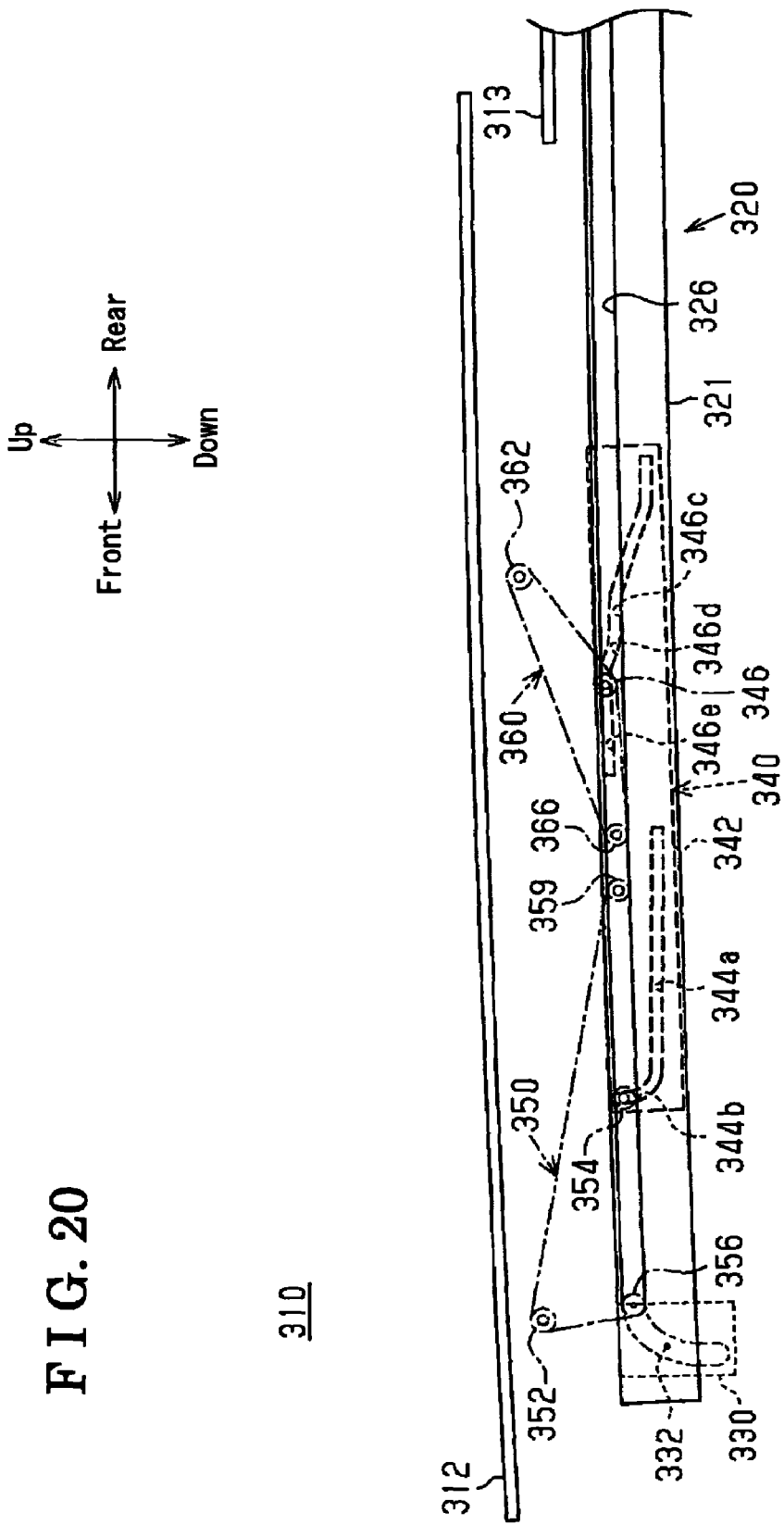
FIG. 20 is a cross-sectional diagram illustrating the configuration of the sun roof apparatus centering on the movable panel in a state where the pop-up operation is completed when being viewed in the vehicle width direction.

Illustrated in FIG. 20 is a cross-sectional diagram of the sun roof apparatus 310 centering on the movable panel 312 in a state where the pop-up operation is completed when being viewed in the vehicle width direction. As is the case with FIG. 18, different components are indicated by different types of lines.

As illustrated in FIG. 20, in a case where the drive shoe 340 is rearwardly displaced from the state where the tilt-up operation is completed, the front engagement pin 354 is displaced from the rear groove 344a to a front groove 344b, so that the front engagement pin 354 is eventually displaced to an upper end portion of the front groove 344b in response to the rearward movement of the drive shoe 340. In this case, the front support pin 356 is displaced within the curved groove 332 in the diagonally rearward and upward direction, so that the front support pin 356 is eventually displaced to a rear end portion of the curved groove 332.

Accordingly, the front link member 350 is rotated about the front rotating pin 359 in a clockwise direction in FIG. 20 while being rearwardly displaced. As a result, a front end portion of the movable panel 312 is lifted up in response to the rotation of the front link member 350.

On the other hand, in this case, the rear engagement pin 364 is relatively displaced within the intermediate longitudinal groove 346c and a front inclined groove 346d in the forward direction in the above-mentioned order, so that the rear engagement pin 364 is eventually displaced to a rear end portion of a front longitudinal groove 346e. Furthermore, the rear link member 360 is rotated about the rear support pin 366 in the counterclockwise direction while being rearwardly displaced in response to the displacement of the rear engagement pin 364 in the upward direction.

Figure 21:
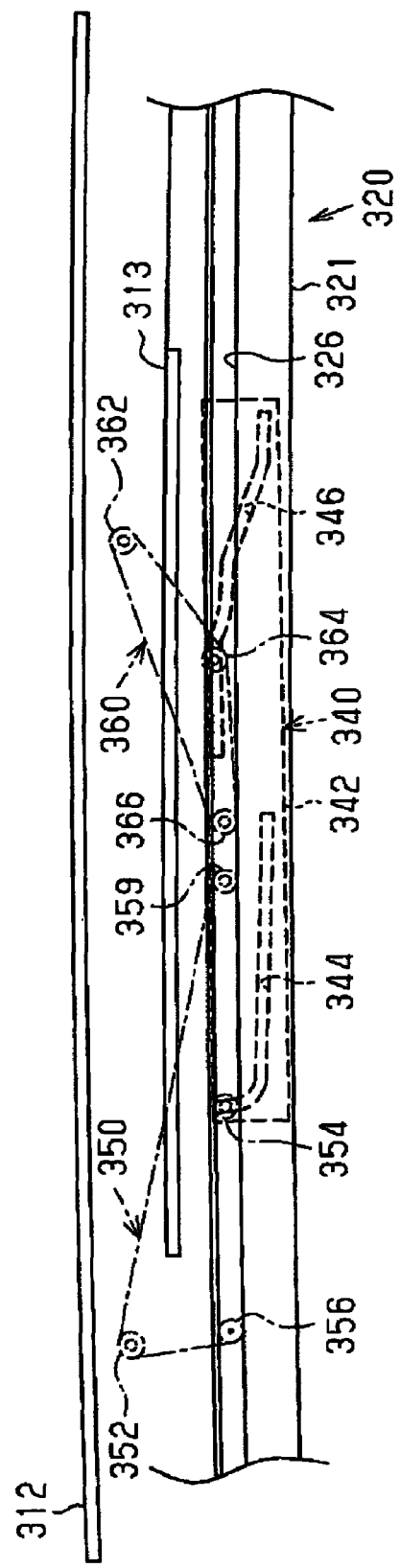
FIG. 21 is a cross-sectional diagram illustrating the configuration of the sun roof apparatus centering on the movable panel in a state where the slide operation is completed when being viewed in the vehicle width direction.

Accordingly, the movable panel 312 is turned to be in a state where the movable panel 312 extends along a fixing panel 313 in the front-rear direction while being rearwardly displaced. Consequently, the pop-up operation is completed. In a case where the drive shoe 340 is further rearwardly displaced from the state illustrated in FIG. 20, the movable panel 312 is rearwardly slid as illustrated in FIG. 21.

According to the sun roof apparatus 310 of the third embodiment, advantages and merits similar to the first embodiment may be achieved.

The sun roof apparatus according to the embodiments may be changed and modified as follows. According to the first embodiment, the guide rail 20 is configured so that the supporting wall portion 26 supports both of the front support pin 56 and the rear support pin 66, which may result in avoiding the increase of the size of the guide rails 20 in the vehicle width direction (the same applies to the second and third embodiments). However, the sun roof apparatus (10, 210, 310) may be modified so that the front support pin (56, 256, 356) and the rear support pin (66, 266, 366) are supported by different portions.

According to the embodiments, the link member main body (51a, 251a, 351a) is configured so as to include the front engagement pin (54, 254, 354) and the front support pin (56, 256, 356) and so as to be arranged outwardly of the front guide member (30, 230, 330). Furthermore, the front connecting pin (52, 252, 352) defines the front end portion of the front link member (50, 250, 350) and is located inwardly of the front guide member (30, 230, 330). Accordingly, the curved portion 113 of the front housing 110 is allowed to have a larger curvature radius, which may result in reducing the weight of the front housing 110. However, the sun roof apparatus (10, 210, 310) of the embodiments may be modified so that the front connecting pin (52, 252, 352), together with the link member main body (51b, 251b, 351b), is arranged at a position outward of the front guide member (30, 230, 330) in the vehicle width direction.

According to the embodiments, the base portion 91 of the weather strip 90 is held by the outer vertical wall portion 25b, the inner vertical wall portion 25c and the flange portion 1b. However, the holding portion 25 for holding the weather strip 90 may be modified. For example, the inner vertical wall portion 25c may be removed from the holding portion 25. In this case, the base portion 91 of the weather strip 90 may be held by the outer vertical wall portion 25b and the flange portion 1b. Alternatively, the outer vertical wall portion 25b may be removed from the holding portion 25. In this case, the base portion 91 of the weather strip 90 may be held by the inner vertical wall portion 25c and the flange portion 1b.

The configuration of the base portion 91 of the weather strip 90 is not limited to the above-mentioned embodiments. For example, a number of protrusions formed at the inner circumferential surface of the base portion main body 92 or positions at which protrusions are formed may be changed.

According to the above-mentioned embodiments, the sun roof apparatus is configured so that the guide portion 27 contacts the rear portion of the guide surface 80b of the restriction block 80 so that the guide surface 80b and the guide portion 27 are located at the approximately same position (correspond to each other) in the vehicle width direction. Accordingly, the size of the guide rails 20 in the vehicle width direction may be avoided from being increased. However, the sun roof apparatus (10, 210, 310) may be modified so that the guide portion 27 does not contact the rear portion of the restriction surface 80a. In other words, the restriction surface 80a and the guide portion 27 may be arranged at different positions (so as not to correspond to each other) in the vehicle width direction.

According to the above-mentioned embodiments, the belt supporting portion 28 is arranged right below the holding portion 25 of the guide rail 20 and outward of the guide portion 27 in the vehicle width direction in order to effectively use the space formed below the holding portion 25. Accordingly, the increase of the size of the guide rail 20 in the vehicle width direction may be restrained. However, the position of accommodating the belt 100, which is configured so as to drive the drive shoe (40, 240, 340), is not limited to the above-mentioned position. For example, the belt 100 may be accommodated below the drive shoe (40, 240, 340). Furthermore, the belt 100 may be arranged so as not to be overlapped with the drive shoe (40, 240, 340) in the front-rear direction.

According to the above-mentioned embodiments, the guide portion 27, which is configured so as to be engaged with the engagement protruding portion 48 in order to guide the drive shoe 40, is provided right below the holding portion 25 of the guide rail 20. Accordingly, the space formed below the holding portion 25 is effectively utilized, which may result in avoiding the increase of the size of the guide rail (20, 220, 320) in the vehicle width direction. However, the sun roof apparatus (10, 210, 310) may be modified so that, in a case where the engagement protruding portion 48 is formed so as to upwardly extend from the shoe main body 42, a supporting portion for supporting the upwardly extending engagement portion may be formed at the guide rail (20, 220, 320).

According to the above-mentioned embodiments, the shoe main body (42, 242, 432) is arranged outwardly of the link member main body (51*b*, 251*b*, 351*b*), so that an opening width of the movable panel (12, 212, 312) at a vehicle interior is avoided from being reduced. However, the sun roof apparatus (10, 210, 310) may be modified so that the shoe main body (42, 242, 342) is positioned inwardly of the link member main body (51*b*, 251*b*, 351*b*). In this case, the front support pin (56, 256, 356) is provided so as to outwardly protrude from the link member main body (51*b*, 251*b*, 351*b*). Accordingly, the front support pin (56, 256, 356) may be appropriately and properly avoided from interfering with the drive shoe (40, 240, 340).

According to the above-mentioned embodiments, the holding portion 25, which is configured so as to be located right below the flange portion 1*b* and so as to hold the weather strip 90, is provided at the guide rail 20. However, a configuration of attaching the weather strip 90 of the sun roof apparatus (10, 210, 310) may be modified. As long as the weather strip 90 is configured so as to seal the clearance formed between the opening edge portion of the roof panel 1 extending in the front-rear direction and the edge portion of the movable panel (12, 212, 312) is attachable at the opening edge portion (i.e. the flange portion 1*b*). any desired attachment configuration may be adapted.

The lifting mechanism according to the embodiments is not limited to the rear link mechanism (60, 260, 360). For example, the sun roof apparatus (10, 210, 310) may be modified so that the rear link member (60, 260, 360) is lifted by means of another drive shoe, which is provided at the guide rail (20, 220, 320) separately from and independently of the drive shoe (40, 240, 340) driving the front link member (50, 250, 350). In this case, the additional drive shoe of the rear link mechanism (60, 260, 360) is driven interlockingly with the movement of the drive shoe (40, 240, 340) of the front link member (50, 250, 350).

Technical ideas conceivable from the above-mentioned embodiments and modified examples will be described below. According to the embodiments, the flange portion 1*b* extending from the panel main body 1*a* in the vertically downward direction defines the opening edge portion of the roof panel 1. The weather strip 90 includes the base portion 91 enclosing the flange portion 1*b*. The holding portion 25 includes at least one of the inner vertical wall portion 25*c*, which serves as the vertical wall portion extending in the vertical direction and which is arranged so as to be positioned inwardly of the flange portion 1*b* in the vehicle width direction, and the outer vertical wall portion 25*b*, which serves as the vertical wall portion extending in the vertical direction an which is arranged so as to be positioned outwardly of the flange portion 1*b*. The base portion 91 of the weather strip 90 is held by the flange portion 1*b* and at least one of the inner vertical wall portion 25*c* and the outer vertical wall portion 25*b*.

According to the embodiments, the front link member (50, 250, 350) includes the front connecting pin (52, 252, 352), by which the front link member (50, 250, 350) is connected to the front portion of the functional bracket 70 so as to be rotatable relative to the functional bracket 70, the front engagement pin (54, 254, 354), which is positioned rearwardly of the front connecting pin (52, 252, 352) in the front-rear direction and is engaged with the drive shoe (40, 240, 340) so as to be rotatable relative to the drive shoe (40, 240, 340) and so as to be displaced in response to the movement of the drive shoe (40, 240, 340), and the front support pin (56, 256, 356), which is located forwardly of the front engagement pin (54, 254, 354) and is rotatably supported by the guide rail (20, 220, 320). The front link member (50, 250, 350) includes the front guide member (30, 230, 330), which is configured so as to be provided at the guide rail (20, 220, 320) and to guide the front support pin (56, 256, 356) to be displaced in response to the opening and closing operation of the movable panel (12, 212, 312). The link member main body (51*b*, 251*b*, 351*b*) of the front link member (50, 250, 350) includes the front engagement pin (54, 254, 354) and the front support pin (56, 256, 356). Furthermore, the link member main body (51*b*, 251*b*, 351*b*) of the front link member (50, 250, 350) is located outwardly of the front guide member (30, 230, 330) in the vehicle width direction. The front connecting pin (52, 252, 352) defines the front end portion of the front link member (50, 250, 350) in the front-rear direction of the vehicle and is located inwardly of the front guide member (30, 230, 330) in the vehicle width direction.

Accordingly, the front connecting pin (52, 252, 352), which is located at the front end portion of the front link member (50, 250, 350), is inwardly displaced relative to the link member main body (51*b*, 251*b*, 351*b*) having the front engagement pin (54, 254, 354) and the front support pin (56, 256, 356) in the vehicle width direction. Therefore, when comparing to a sun roof apparatus not having the above-mentioned configuration, the shape of the front end portion of the sun roof apparatus (10, 210, 310) may be formed so as to have the greater curvature radius at the curved portion 113 of the front housing 110, which connects the front end portions of the respective guide rails (20, 220, 320) arranged while keeping the distance therebetween in the vehicle width direction. As a result, the weight of the front housing 110 may be reduced. Consequently, the design flexibility of the housing 110 may be increased.

According to the embodiments, the lifting mechanism includes the rear link member (60, 260, 360). The rear link member (60, 260, 360) includes the rear connecting pin (62, 262, 362), which is connected to the rear portion of the functional bracket 70 while allowing the rear link member (60, 260, 360) to be rotatable relative to the functional bracket 70, the rear engagement pin (64, 264, 364), which is located forwardly of the rear connecting pin (62, 262, 362) and is engaged with the drive shoe (40, 240, 340) so as to be rotatable relative to the drive shoe (40, 240, 340) and so as to be guided (displaced) in response to the movement of the drive shoe (40, 240, 340), and the rear support pin (66, 266, 366), which is located forwardly of the rear engagement pin (64, 264, 364) and is rotatably supported by the guide rail (20, 220, 320). The guide rail (20, 220, 320) supports the front support portion (56, 256, 356) of the front link member (50, 250, 350)

and the rear support pin (66, 266, 366) of the rear link member (60, 260, 360) by the single supporting wall portion (26, 226, 326).

Accordingly, in the case where the drive shoe (40, 240, 340) is rearwardly displaced from the position where the drive shoe (40, 240, 340) is located while the movable panel (12, 212, 312) is in the fully-closed state, the rear engagement pin (64, 264, 364) is guided by the drive shoe (40, 240, 340), so that the rear end portion of the functional bracket 70 is lifted up while the rear link member (60, 260, 360) is supported by the guide rail (20, 220, 320) in response to the rearward movement of the drive shoe (40, 240, 340) (i.e. a tilt-up mode).

Then, in the case where the drive shoe (40, 240, 340) is further rearwardly displaced from the state where the tilt-up operation is completed, the rear engagement pin (64, 264, 364) is guided by the drive shoe (40, 240, 340), so that the rear end portion of the functional bracket 70 is further lifted up while the rear support pin (66, 266, 366) is supported by the guide rail (20, 220, 320) in response to the further rearward movement of the drive shoe (40, 240, 340) (i.e. the pop-up operation is completed).

Accordingly, the front support pin (56, 256, 356) of the front link member (50, 250, 350) is supported by the front portion of the supporting wall portion (26, 226, 326), which is formed at the guide rail (20, 220, 320). On the other hand, the rear support pin (66, 266, 366) of the rear link member (60, 260, 360) is supported by the rear portion of the supporting wall portion (26, 226, 326). Therefore, when comparing to a sun roof apparatus that is configured so that a portion of supporting the front support pin and a portion of supporting the rear support pin are located so as to be displaced from each other in the vehicle width direction, the size of the guide rail (20, 220, 320) may be avoided from being increased in the vehicle width direction.

According to the embodiments, the sun roof apparatus (10, 210, 310), which is configured so as to open and close the movable panel (12, 212, 312) provided at the opening portion (2) of the roof panel (1) of the vehicle and which includes the tilt-up mode and the slide mode as opening and closing operation modes, the sun roof apparatus (10, 210, 310) includes the guide rail (20, 220, 320) fixed at the roof panel (1) and extending in the front-rear direction of the vehicle, the drive shoe (40, 240, 340) driven so as to move along the guide rail (20, 240, 340) in the front-rear direction of the vehicle, the functional bracket (70) supporting the movable panel (12, 212, 312), the front link member (50, 250, 350) connected at the front portion of the functional bracket (70) so as to be rotatable relative to the functional bracket (70), including the front support pin (56, 256, 356), which is rotatably supported by the supporting wall portion (26, 226, 326) of the guide rail (20, 220, 320), and operating the front portion of the functional bracket (70) in the manner that the front link member (50, 250, 350) is displaced in response to a movement of the drive shoe (40, 240, 340), the rear link member (60, 260, 360) connected to the rear portion of the functional bracket (70) and lifting the rear portion of the functional bracket (70) in response to the movement of the drive shoe (40, 240, 340), and the weather strip (90) attached at the flange portion (1*b*) of the roof panel (1) extending in the front-rear direction of the vehicle and sealing the clearance formed between the flange portion (1*b*) and the edge portion of the movable panel (20, 220, 320), wherein the supporting wall portion (26, 226, 326) of the guide rail (20, 220, 320) and the front support pin (56, 256, 356) of the front link member (50, 250, 350) are located inwardly of the outer end surface of the movable panel (12, 212, 312) in the vehicle width direction, the drive shoe (40, 240, 340) is located downwardly of the weather strip (90) in the vertical direction, and the front link member (50, 250, 350) is located between the supporting wall portion (26, 226, 326) of the guide rail (20, 220, 320) and the drive shoe (40, 240, 340) in the vehicle width direction.

Accordingly, in the case where the drive shoe (40, 240, 340) is rearwardly displaced from the position where the drive shoe (40, 240, 340) is located while the movable panel (12, 212, 312) is in the fully-closed state, the rear end portion of the functional bracket 70 is lifted up through an operation of the rear link member (60, 260, 360), while the front link member (50, 250, 350) is rotated in response to the movement of the drive shoe (40, 240, 340). Consequently, the front end portion of the functional bracket 70 is rotated while remaining at the position where the functional bracket 70 is located while the movable panel (12, 212, 312) is in the fully-closed state (i.e. the tilt-up mode).

Then, in the case where the drive shoe (40, 240, 340) is further rearwardly displaced from the state where the tilt-up operation is completed, the front link member (50, 250, 350) is guided by the drive shoe (40, 240, 340) so as to be displaced, so that the front end portion of the functional bracket 70 is lifted up. Consequently, the movable panel (12, 212, 312) is turned to be in the state where the movable panel (12, 212, 312) extends along the roof panel 1 in the front-rear direction, thereby completing the so-called pop-up operation.

In the case where the drive shoe (40, 240, 340) is further rearwardly displaced from the state where the pop-up operation is completed, the movable panel (12, 212, 312) is rearwardly slid (i.e. a slide mode). According to the embodiments, the front support pin (56, 256, 356) controlling the displacement of the front link member (50, 250, 350) in the vertical direction is located inwardly of the outer end surface of the movable panel (12, 212, 312) in the vehicle width direction. Therefore, the front support pin (56, 256, 356) is not likely to interfere with the weather strip 90. In other words, the shape of the weather strip 90 is avoided from being limited by the front link member (50, 250, 350). Therefore, even in the case where the attachment state of the weather strip 90 relative to the flange portion 1*b* of the roof panel 1 extending in the front-rear direction is changed, the excessive interference between the front link member (50, 250, 350) and the weather strip 90 may be avoided.

According to the embodiments, the front support pin (56, 256, 356) is provided so as to inwardly protrude from the link member main body (51*b*, 251*b* 351*b*) of the front link member (50, 250, 350) in the vehicle width direction.

Accordingly, the front support pin (56, 256, 356) is appropriately avoided from interfering with the drive shoe (40, 240, 340).

According to the embodiments, the drive shoe (40) includes the engagement protruding portion (48), which outwardly protrudes from the shoe main body (42) of the drive shoe (40) in the vehicle width direction. The guide portion (27), which engages with the engagement protruding portion (48) in order to guide the drive shoe (40), is formed at the guide rail (20) so as to be located right below the weather strip (90).

Accordingly, the space formed below the weather strip 90 may be effectively utilized. As a result, the increase of the size of the guide rail (20, 220, 320) in the vehicle width direction may be appropriately and properly become avoidable.

According to the embodiments, the belt supporting portion (28) supporting the belt (100), which drives the drive shoe (40), is formed at the guide rail (20) so as to be located right below the weather strip (90) and so as to be located outwardly of the guide portion (27) in the vehicle width direction.

Accordingly, the space formed below the weather strip 90 may be effectively used. As a result, the increase of the size of the guide rail (20, 220, 320) in the vehicle width direction may be further appropriately avoided.

According to the first embodiment, the front link member (50) includes the restriction pin (58), which outwardly protrudes from the link member main body (51*b*) of the front link member (50) in the vehicle width direction. The guide rail (20) includes the restriction surface (80*a*), which is located rearwardly of the restriction pin (58) and which restricts the rearward movement of the front link member (50) while the movable panel (12) is in the fully-closed state and a guide surface (80*b*) guiding the restriction pin (58) to be displaced in response to the opening and closing operation of the movable panel (12). The guide portion (27) is connected to the rear end portion of the guide surface (80*b*) in the front-rear direction of the vehicle.

Accordingly, while the movable panel (12, 212, 312) is in the fully-closed state, the displacement of the restriction pin 58 in the rearward direction may be restricted by the restriction surface 80*a*. Furthermore, the displacement of the restriction pin 58 is guided by the restriction surface 80*a* and the guide portion 27 in the case where the movable panel (12, 212, 312) is opened and closed. In other words, the restriction surface 80*a* restricting and guiding the movement of the front link member (50, 250, 350) and the guide portion 27 guiding the movement of the drive shoe (40, 240, 340) are arranged to as to be positioned at the same level (so as to correspond to each other) in the vehicle width direction. Therefore, the increase of the size of the guide rail (20, 220, 320) in the vehicle width direction may be further appropriately avoided.

According to the embodiments, the front link member (50, 250, 350) includes the front connecting pin (52, 252, 352) connected at the front portion of the functional bracket (70) while allowing the front link member (50, 250, 350) to be rotatable relative to the functional bracket (70) and the front engagement pin (54, 254, 354), which is located rearwardly of the front connecting pin (52, 252, 352) in the front-rear direction, is engaged with the drive shoe (40, 240, 340) so as to be rotatable relative to the drive shoe (40, 240, 340) and is guided to be displaced in response to the movement of the drive shoe (40, 240, 340). The front support pin (56, 256, 356) is located forwardly of the front engagement pin (54, 254, 354) in the front-rear direction. Furthermore, the front link member (50, 250, 350) includes the front guide member (30, 230, 330), which is provided at the guide rail (20, 220, 320) and guides the front support pin (56, 256, 356) to be displaced in response to the opening and closing operation of the movable panel (12, 212, 312).

According to the embodiments, the guide rail (20) includes the holding portion (25), which is located right below the flange portion (1*b*) of the roof panel (1) in the vertical direction and which holds the weather strip (90).

Accordingly, because the holding portion 25 is provided right below the flange portion 1*b* of the roof panel 1, an accurate and appropriate positional relationship between the weather strip 90 and each of the holding portion 25 and the front link member (50, 250, 350) may be determined even in the case where the space formed below the holding portion 25 is limited.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A roof apparatus, which is configured so as to open and close a movable panel provided at an opening portion of a roof panel of a vehicle and which includes a tilt-up mode and a slide mode as opening and closing operation modes, the roof apparatus comprising:
   a guide rail fixed at the roof panel and extending in a front-rear direction of the vehicle;
   a drive shoe driven so as to move along the guide rail in the front-rear direction of the vehicle;
   a functional bracket supporting the movable panel;
   a front link member connected at a front portion of the functional bracket so as to be rotatable relative to the functional bracket, including a supporting portion, which is rotatably supported by a supporting wall portion of the guide rail, and operating the front portion of the functional bracket in a manner that the front link member is displaced in response to a movement of the drive shoe;
   a lifting mechanism connected to a rear portion of the functional bracket and lifting the rear portion of the functional bracket in response to the movement of the drive shoe; and
   a weather strip attached at an opening edge portion of the roof panel extending in the front-rear direction of the vehicle and sealing a clearance formed between the opening edge portion and an edge portion of the movable panel, wherein
   the supporting wall portion of the guide rail and the supporting portion of the front link member are located inwardly of an outer end surface of the movable panel in a vehicle width direction;
   the drive shoe is located downwardly of the weather strip in a vertical direction;
   the front link member is located between the supporting wall portion of the guide rail and the drive shoe in the vehicle width direction;
   wherein the drive shoe includes an engagement protruding portion, which outwardly protrudes from a main body of the drive shoe in the vehicle width direction and a guide portion, which engages with the engagement protruding portion in order to guide the drive shoe, is formed at the guide rail so as to be located right below the weather strip.

2. The roof apparatus according to claim 1, wherein the supporting portion is provided so as to inwardly protrude from a main body of the front link member in the vehicle width direction.

3. The roof apparatus according to claim 1, wherein a belt supporting portion supporting a belt, which drives the drive shoe, is formed at the guide rail so as to be located right below the weather strip and so as to be located outwardly of the guide portion in the vehicle width direction.

4. The roof apparatus according to claim 1, wherein the front link member includes a restriction protruding portion, which outwardly protrudes from a main body of the front link member in the vehicle width direction, the guide rail includes a restriction surface, which is located rearwardly of the restriction protruding portion and which restricts a rearward movement of the front link member while the movable panel is in a fully-closed state, and a guide surface guiding the restriction protruding portion to be displaced in response to an opening and closing operation of the movable panel, and a guide portion is connected to a rear end portion of the guide surface in the front-rear direction of the vehicle.

5. The roof apparatus according to claim 1, wherein the front link member includes a connecting portion connected at the front portion of the functional bracket while allowing the front link member to be rotatable relative to the functional bracket and an engagement portion, which is located rearwardly of the connecting portion in the front-rear direction, is engaged with the drive shoe so as to be rotatable relative to the drive shoe and is guided to be displaced in response to the movement of the drive shoe, the supporting portion is located forwardly of the engagement portion in the front-rear direction, and the front link member interacts with a front guide member, which is provided at the guide rail and guides the supporting portion to be displaced in response to an opening and closing operation of the movable panel.

6. The roof apparatus according to claim 1, wherein the guide rail includes a holding portion, which is located right below the opening edge portion of the roof panel in the vertical direction and which holds the weather strip.

* * * * *